US008565576B2

(12) United States Patent
Chen et al.

(10) Patent No.: US 8,565,576 B2
(45) Date of Patent: Oct. 22, 2013

(54) OPTICAL DISC FOR REPRODUCING STEREOSCOPIC VIDEO IMAGE

(75) Inventors: Tao Chen, La Canada Flintridge, CA (US); Yoshiichiro Kashiwagi, Kyoto (JP); Hisao Sasai, Osaka (JP); Yi Zhao, San Gabriel, CA (US)

(73) Assignee: Panasonic Corporation, Osaka (JP)

( * ) Notice: Subject to any disclaimer, the term of this patent is extended or adjusted under 35 U.S.C. 154(b) by 240 days.

(21) Appl. No.: 12/989,950

(22) PCT Filed: May 1, 2009

(86) PCT No.: PCT/JP2009/001986
§ 371 (c)(1),
(2), (4) Date: Oct. 27, 2010

(87) PCT Pub. No.: WO2009/133714
PCT Pub. Date: Nov. 5, 2009

(65) Prior Publication Data
US 2011/0038614 A1    Feb. 17, 2011

Related U.S. Application Data

(60) Provisional application No. 61/049,707, filed on May 1, 2008.

(51) Int. Cl.
*H04N 5/932* (2006.01)
(52) U.S. Cl.
USPC ........... 386/216; 386/217; 386/219; 386/230; 386/248
(58) Field of Classification Search
USPC .......................... 386/216, 217, 219, 230, 248
See application file for complete search history.

(56) References Cited

U.S. PATENT DOCUMENTS

| 5,923,869 | A  | 7/1999  | Kashiwagi et al. |
| 6,393,574 | B1 | 5/2002  | Kashiwagi et al. |
| 6,470,460 | B1 | 10/2002 | Kashiwagi et al. |
| 6,484,266 | B2 | 11/2002 | Kashiwagi et al. |
| 6,502,198 | B2 | 12/2002 | Kashiwagi et al. |
| 6,502,199 | B2 | 12/2002 | Kashiwagi et al. |
| 6,502,200 | B2 | 12/2002 | Kashiwagi et al. |
| 6,516,138 | B2 | 2/2003  | Kashiwagi et al. |
| 6,516,139 | B2 | 2/2003  | Kashiwagi et al. |
| 6,519,414 | B2 | 2/2003  | Kashiwagi et al. |

(Continued)

FOREIGN PATENT DOCUMENTS

| JP | 2000-270347 | 9/2000 |
| JP | 2002-209232 | 7/2002 |

(Continued)

*Primary Examiner* — Thai Tran
*Assistant Examiner* — Jose Mesa

(57) ABSTRACT

[Problem] To provide an optical disc whose monoscopic and stereoscopic video images recorded thereon can be respectively played back on a playback device incapable of 3D display and on a 3D-capable playback device.
[Means to Solve Problem] An optical disc includes an AV data recording and a navigation information area. The AV data recording area has TS, having a plurality of TSPBs and TSSBs are arranged in an interleaved manner, recorded thereon. TSPBs constitute a video stream representing monoscopic video. TSSBs constitute a video stream representing parallax video corresponding to the monoscopic video. The navigation information area has navigation information recorded therein. The navigation information has base location information and enhanced location information that is used only for stereoscopic video playback. The base location information indicates an area in which TSPBs are recorded. The enhanced location information indicates an area in which TSSBs are recorded.

9 Claims, 30 Drawing Sheets

(56) References Cited

U.S. PATENT DOCUMENTS

| | | |
|---|---|---|
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,747,145 B2 | 6/2010 | Oshima et al. |
| 8,081,206 B2 * | 12/2011 | Martin et al. ............ 348/42 |
| 8,200,064 B2 * | 6/2012 | Oshima et al. .......... 386/248 |
| 2005/0180735 A1 | 8/2005 | Oshima et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0181576 A1 * | 7/2008 | Kang et al. ............ 386/95 |
| 2008/0292287 A1 | 11/2008 | Oshima et al. |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0111503 A1 | 5/2010 | Oshima et al. |
| 2010/0119213 A1 | 5/2010 | Oshima et al. |
| 2010/0254679 A1 | 10/2010 | Sasaki et al. |

FOREIGN PATENT DOCUMENTS

| | | |
|---|---|---|
| JP | 2006-135747 | 5/2006 |
| JP | 2007-166651 | 6/2007 |
| JP | 3935507 | 6/2007 |
| JP | 2009-004940 | 1/2009 |
| JP | 2010/032404 | 3/2010 |
| WO | 97/32437 | 9/1997 |

* cited by examiner

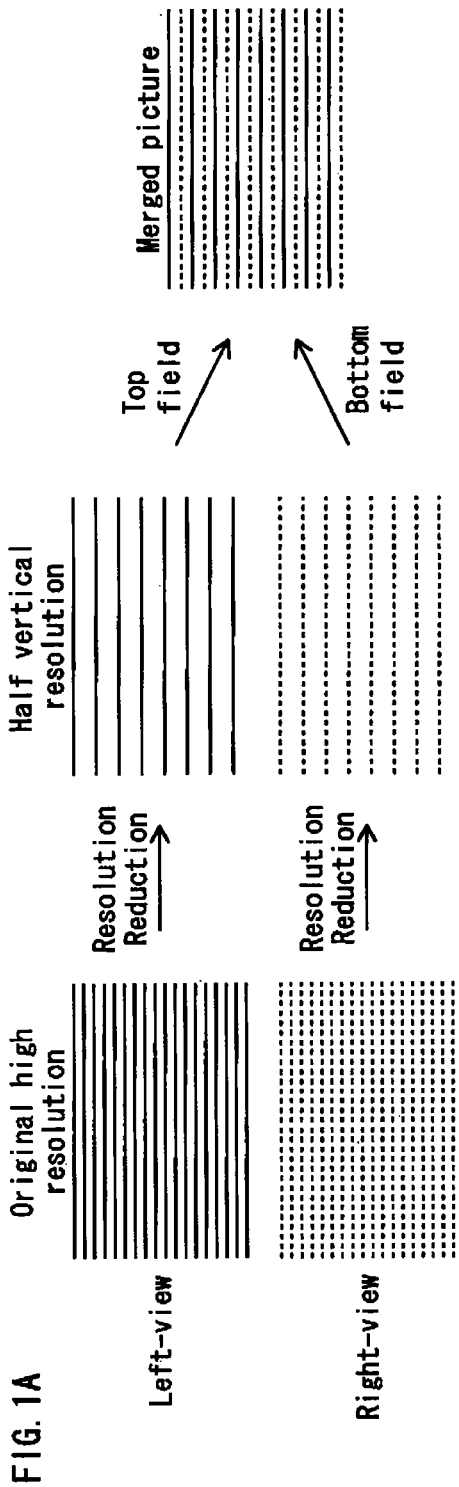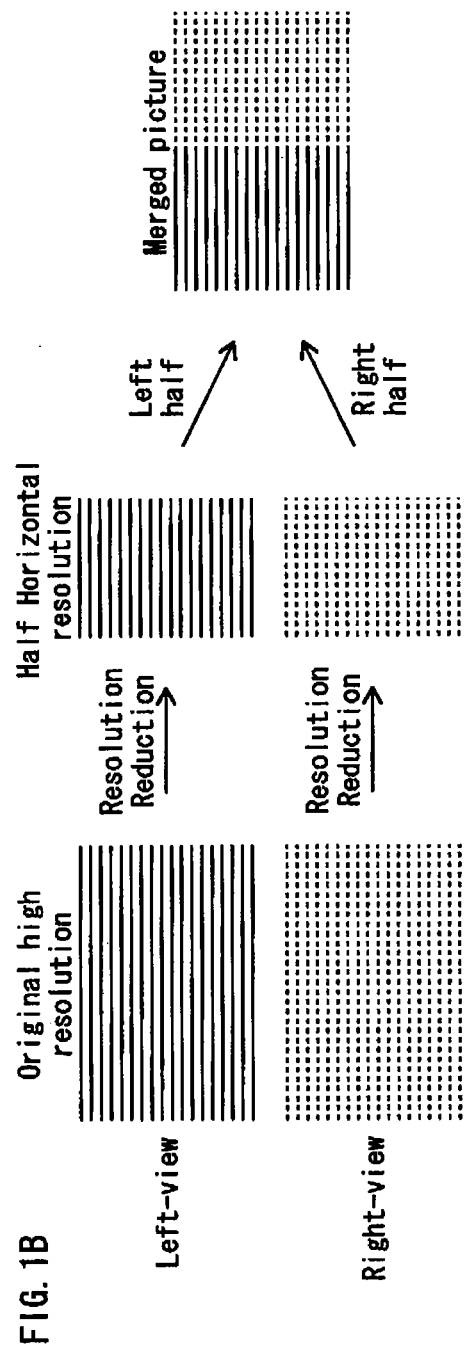
FIG. 1A
FIG. 1B

FIG. 2

1920x1080 @ 24fps [L][L][L][L][L][L] — Left-view pictures

1920x1080 @ 24fps [R][R][R][R][R][R] — Right-view pictures

1920x1080 @ 48fps [L][R][L][R][L][R][L][R][L][R][L][R][L][R]

FIG. 4A

| Header with normal parameter values | Left-view picture | Header with a flag showing a 2nd view picture following | Right-view picture | Header with normal parameter values | Left-view picture | Header with a flag showing a 2nd view picture following | Right-view picture |

FIG. 4B

| Header with normal parameter values | Left-view picture | Header with a flag showing a 2nd view picture following | Right-view picture | Header with a flag showing a 2nd view picture following | Left-view picture | Header with a flag showing a 2nd view picture following | Right-view picture |

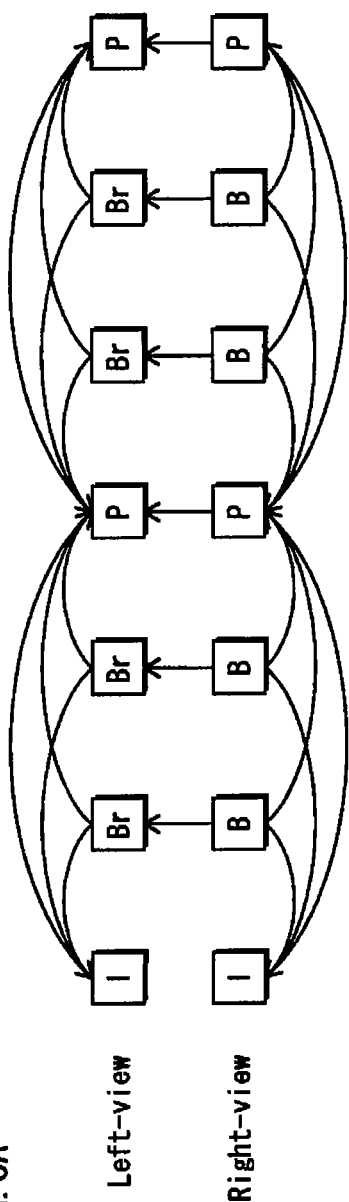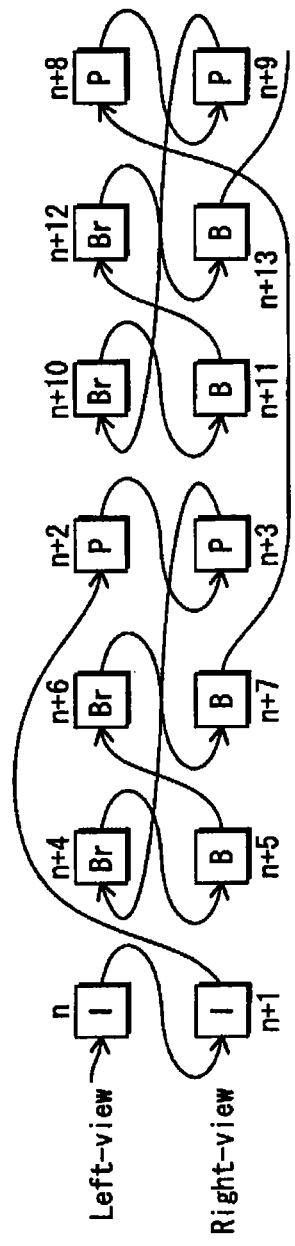

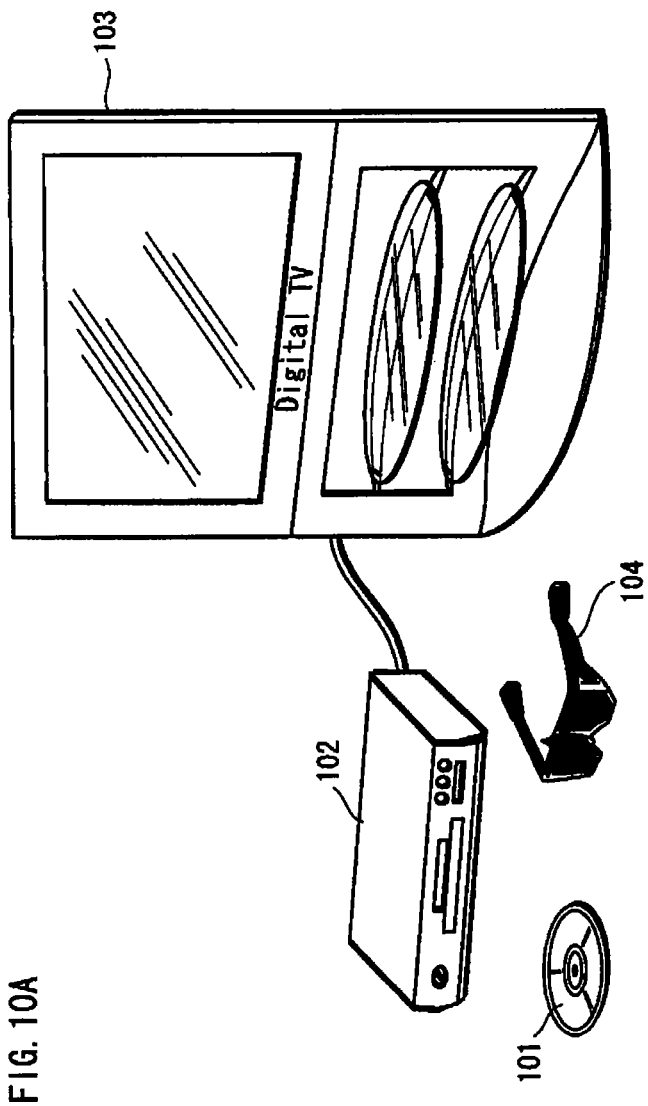
FIG. 10A
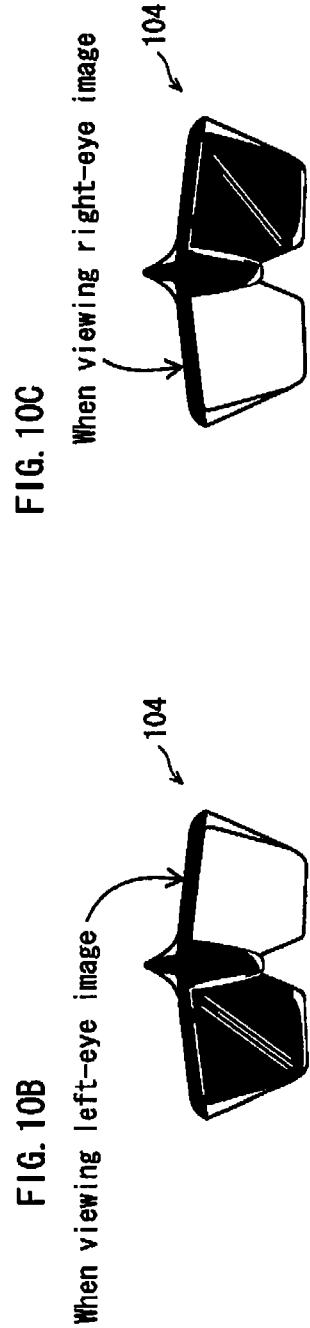
FIG. 10C
When viewing right-eye image
FIG. 10B
When viewing left-eye image

FIG. 15

| PID range | PES stream type |
|---|---|
| 0x0100 | Program map |
| 0x1001 | PCR |
| 0x1011 | Video Base View (L or R) |
| 0x1012 | Video Enhanced View (R or L) |
| 0x1100-111F | Audio |

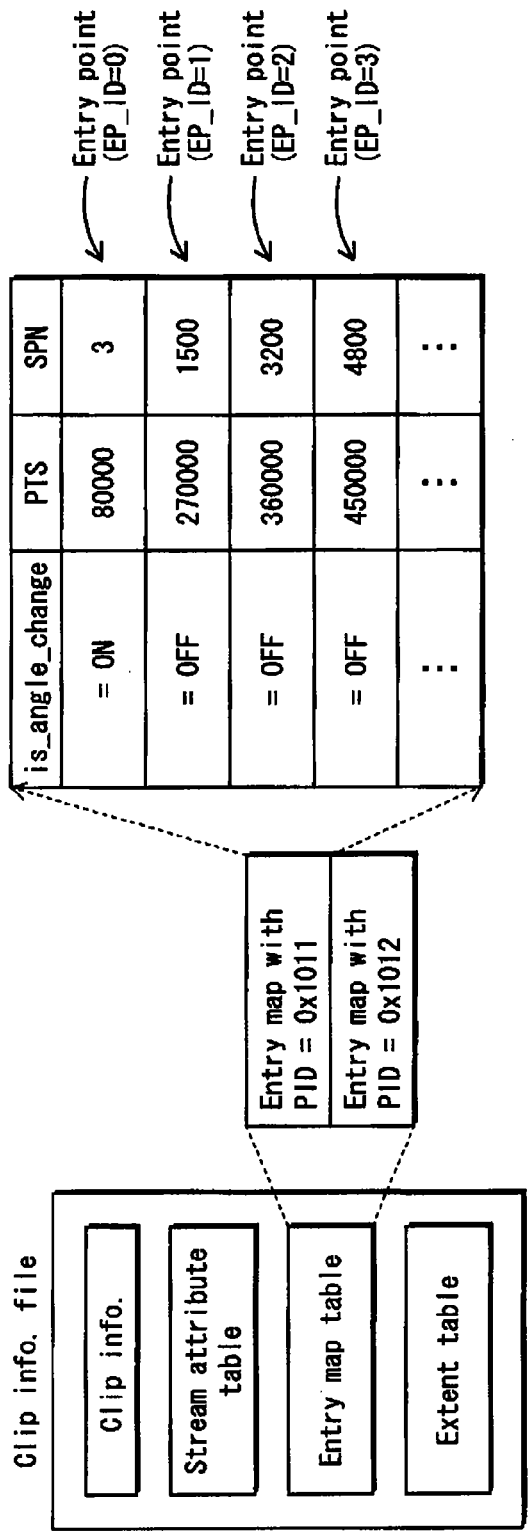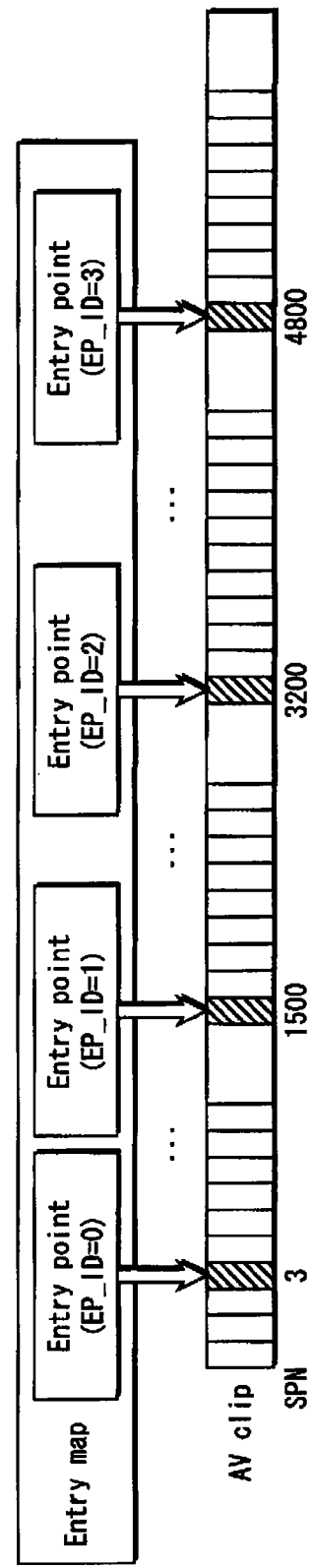
FIG. 20A
FIG. 20B

OPTICAL DISC FOR REPRODUCING STEREOSCOPIC VIDEO IMAGE

TECHNICAL FIELD

The present invention relates to an information recording medium having 3D video recorded thereon, and particularly relates to an application format for recording stereoscopic video on an information recording medium.

BACKGROUND ART

The releases of 3D-capable high-definition TVs bring high-definition 3D viewing experience to consumers. Delivering high-quality and high-definition 3D movies through packaged media or broadcast services is expected in the future.

Currently known techniques deployed in broadcast applications reduce resolution to achieve 3D video compression, so that the picture quality is degraded.

The resolution is reduced so as not to cause a 3D video stream to exceed the maximum bit rate defined in the coding standard. Thus, in broadcast and DVD applications, a left-view and right-view picture pair has been modified in resolution in order to make up a new picture such that compression can be performed using existing systems.

FIGS. 1A and 1B show conventional techniques for synthesizing pictures using existing systems for compression. It is clear that the synthesized pictures according to the conventional techniques preserve only half of the original pictures. Therefore, a device such as a player or set-top box can only recover half of the original pictures for each view. Displaying half resolution pictures on full resolution displays certainly causes degradation in the picture quality, where softness is commonly observed in the pictures. When a user selects to view 2D video, the original high-definition video is never available if the content is delivered in either way shown in FIG. 1A or 1B.

For example, in the case of reducing the horizontal resolution by half, the reduced left-view and the reduced right-view pictures become the left half and the right half of the new picture, respectively. By reducing the vertical resolution by half, the reduced left-view and the reduced right-view pictures are at the top field and the bottom field of the new picture, respectively.

CITATION LIST

Non-Patent Literature

[Non-Patent Literature 1]
System description: Blu-ray disc read-only format—Part 3: Audio visual basic specifications, August 2006
[Non-Patent Literature 2]
ISO/IEC 14496-10:2005: Information technology—Coding of audio-visual objects—Part 10: Advanced Video Coding
[Non-Patent Literature 3]
ISO/IEC 13818-2: 2000 Information technology—Generic coding of moving pictures and associated audio information: Part 2: Video (MPEG-2 Video)
[Non-Patent Literature 4]
SMPTE 421M, Proposed SMPTE Standard for Television: VC-1 Compressed Video Bitstream Format and Decoding Process

SUMMARY OF INVENTION

Technical Problem

According to either one of the conventional techniques, the original picture resolution cannot be preserved, and the perceived stereoscopic video has only half of the original resolution. In consequence, high-quality high-definition 2D video cannot be recovered from the same media (e.g. optical disc package). On a normal display for reproducing conventional 2D video images, a user can only view low-resolution pictures.

The object of the present invention is to provide an optical disc that enables a conventional playback device to play back monoscopic images and a 3D-capable playback device to play back stereoscopic images.

Solution to Problem

The optical disc pertaining to the present invention includes an AV data recording area and a navigation information area, wherein the AV data recording area has, recorded thereon, a transport stream where a plurality of first data blocks constituting a primary stream and a plurality of second data blocks constituting a secondary stream are arranged in an interleaved manner, the primary stream is a video stream representing monoscopic video, the secondary stream is a video stream representing parallax video corresponding to the monoscopic video, the navigation information area has, recorded thereon, navigation information including base location information and enhanced location information that is used only for stereoscopic video playback, the base location information indicates locations of areas where the first data blocks constituting the primary stream are recorded, and the enhanced location information indicates locations of areas where the second data blocks constituting the secondary stream are recorded.

Efficient compression of 3D video is necessary for delivering high-quality high-definition 3D video. Two views forming 3D video are encoded by exploiting the redundancies among the views to improve coding efficiency. Compression is performed in a manner compatible with an existing equipment so that decoding of one view of video allows normal 2D (i.e., monoscopic) display. The motion compensated block transform coding framework of existing standards such as the MPEG-4 AVC video standard is exploited to result in highly efficient, yet practical, coding schemes for 3D video.

Advantageous Effects of Invention

The optical disc of the present invention enables a conventional playback device to play back monoscopic images by reading out the primary stream based on the base location information, and enables a 3D-capable playback device to play back stereoscopic images by reading out the primary stream and the secondary stream based on the base location information and the enhanced location information.

Also, the present invention advantageously keeps the same resolution as the high-definition 2D images while achieving the highly-efficient compression of stereoscopic images. Also, this technique is fully compatible with a conventional video compression standard used in BD-ROM standard. Furthermore, implementation of the present invention can realize digital broadcast services for stereoscopic TV and an optical disc for 3D movies.

Thus, providing the full compatibility with a normal 2D video dedicated equipment allows gradual introduction of high quality stereoscopic display in the future.

BRIEF DESCRIPTION OF DRAWINGS

FIG. 1A schematically shows a technique to reduce the vertical resolution; and FIG. 1B schematically shows a technique to reduce the horizontal resolution;

FIG. 2 shows an example of a picture sequence of two views;

FIG. 4A shows an example of the bitstream structure containing pictures of two views; FIG. 4B shows another example of the bitstream structure containing pictures of two views;

FIG. 8A shows a modification of the reference structure between pictures; and FIG. 8B shows the picture coding order shown by the arrows in the modification of the reference structure;

FIG. 10 shows a home theater system pertaining to Embodiment 2;

FIG. 15 shows correspondence between a plurality of possible value ranges of packet IDs of TS packets and PES stream types of TS packets corresponding to the packet IDs in the value ranges;

FIG. 20A shows the internal structure of an entry map table; and FIG. 20B shows which source packets are indicated by a plurality of entry points in the entry map corresponding to a TS packet with PID=1011;

DESCRIPTION OF EMBODIMENTS

Embodiments of a recording medium pertaining to the present invention are described below.

Embodiment 1

It would be a great benefit if, for example, a 3D video program can be played back on players or receivers for viewing original high-definition resolution 2D movie on a display capable of playing back only 2D movie without applying any post-processing, e.g., up-conversion, to the decoded pictures. It is important to design a system that is able to address this backward compatibility issue. If such backward compatibility is applicable, a video bitstream signal is capable of holding a full resolution 3D movie, and a high definition 2D movie is also available to a consumer who owns only a 2D display. This will save the cost significantly in comparison with the case of producing the 3D and 2D packages separately. Furthermore, consumers do not bother to select either a full-resolution 2D or half-resolution 3D package, or even buy both. The present invention presents a novel way to achieve this object by preserving the original resolution of high-definition pictures in compression. Without altering the original pictures, every high-definition picture of each view is encoded in order to best preserve picture quality.

In the following descriptions of the embodiment, the left-view and the right-view can be switched in compression. That is to say, a stream of either view may be encoded as a stream decodable with reference to itself. In addition, the size of sub-GOP (i.e., the number of B type pictures between two anchor pictures, I or P pictures) can be variable depending on system design. As usual settings, the following examples are applied.

FIG. 2 shows an example of a picture sequence of two views for making stereoscopic video.

According to the present invention, the full sequence is input to 3D video compression, i.e., every picture in each view is encoded and included in the bitstream. Unlike the conventional techniques, this best preserves the original resolution of the pictures. Interleaving at frame level requires a memory/buffer of a minimum size needed to hold video source data for input to encoder as well as for output to display at decoder side. In addition, interleaving at frame level in the bitstream requests for a memory of a minimum size needed to hold coded picture data when inter-view referencing is used.

Figure 3A:
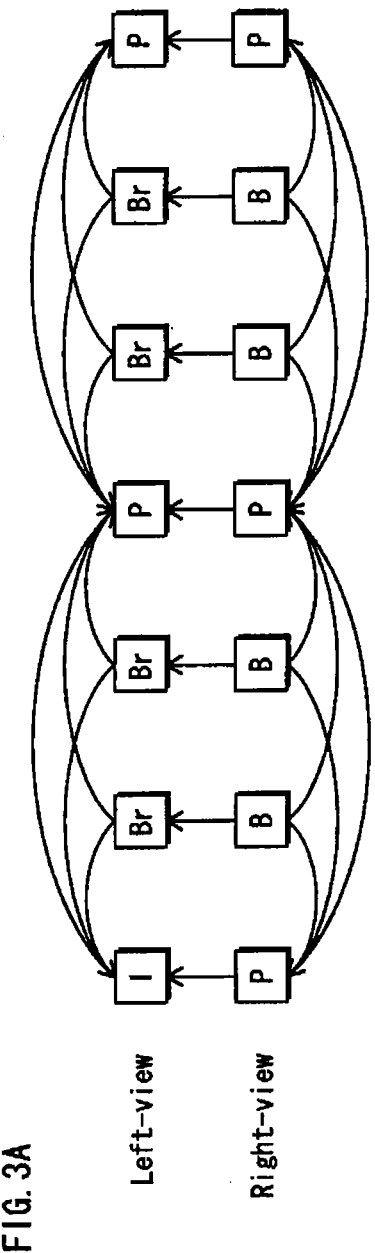
FIG. 3A shows an example of reference structure between pictures.

FIG. 3A shows an example of picture reference structures. The left-view sequence is encoded in a way fully compliant with the AVC Standard, and is decodable on a conventional player or receiver. The right-view pictures are encoded with use of highly efficient prediction structures. In particular, cross-view prediction will improve coding efficiency for the right-view pictures and as a result, reduce the bit rate. In the case of using AVC standard (Non-patent Literature 2), the B pictures in the left-view sequence are defined as reference B pictures (Br pictures) that can be used as reference in coding B pictures of the right-view. If another video coding technique (Non-patent Literatures 3 and 4) is used, where the reference B picture is not available, a reference picture (e.g., P picture) can be used instead. In all the following examples, in the case of using a coding technique other than AVC standard, other reference picture than the reference B picture may be used as the reference target in the cross-view prediction, as described above.

Figure 3B:
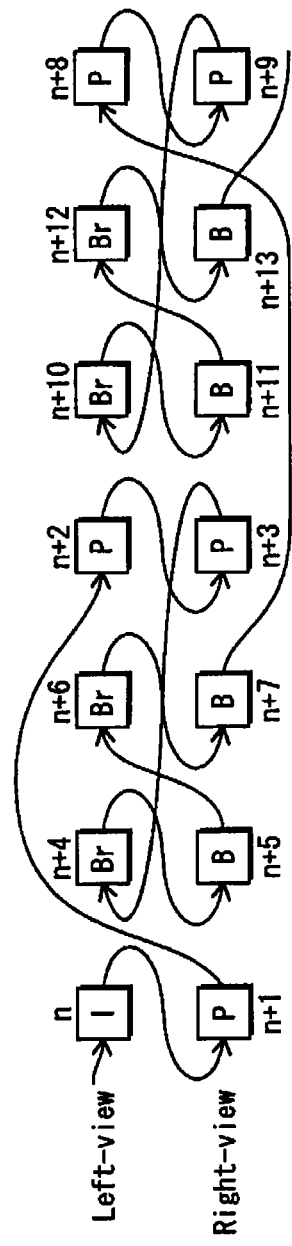
FIG. 3B shows the picture coding order shown by the arrows.

FIG. 3B shows an example of the coding order, where the right-view picture bitstream is interleaved with the left-view picture bitstream at a picture or a frame level.

Left-view pictures are encoded and assembled as an independently decodable bitstream, which is compliant with the current BD-ROM and MPEG-4 AVC standard (Non-patent Literatures 1 and 2). The right-view pictures will be encoded and assembled as an enhancement layer bitstream, which is interleaved with the left-view bitstream at picture level.

For instance, the NAL units containing the right-view picture bitstream use unspecified or reserved values of nal_unit_type (e.g., values of 0, 24 to 31, 14 to 18, or 20 to 24) (Non-patent Literature 2).

Generally, the bitstream generated by the technology of the present invention is applicable to the existing video coding standards (Non-patent Literatures 2, 3 and 4) due to the structure where a header contains some flag or parameter (e.g., at picture or slice level) indicating the source of the packets following. In a case where a header indicates a second view content, the conventional player or receiver ignores the package following. FIG. 4A shows an example of a bitstream structure containing pictures of two views. FIG. 4B shows another example of a bitstream structure containing pictures of two views.

In the interleaving structure, flags or parameters of consecutive pictures from the same view can be used at any time.

For example, in a legacy-2D BD player (2D-BD player) which includes a conventional BD player of Non-patent Literature 2, the decoder is unable to decode the contents of any NAL units that use unspecified or reserved values of nal_unit_type. In other words, a 2D-BD player decodes only the left-view picture bistream and plays back the left-view pictures for viewing high-definition 2D movie on a monoscopic display.

The application, e.g., a broadcast service or packaged media, defines those unspecified (or reserved) values of nal_unit_type so that the contents of all NAL units that use those application specific values of nal_unit_type carry the bitstream of right-view pictures. In a 3D-capable player or set-top box, the decoder identifies those application specific values of nal_unit_type and decodes the right-view picture bitstream. Subsequently, it can reproduce the high-definition stereoscopic video for a 3D-capable display.

In such applications, a 3D-capable BD player or set-top box can also fully decode pictures of both views and have the viewer select what to watch, left-view in original resolution (e.g., 1920*1080), right-view in original resolution, or 3D in original resolution.

Figure 5:
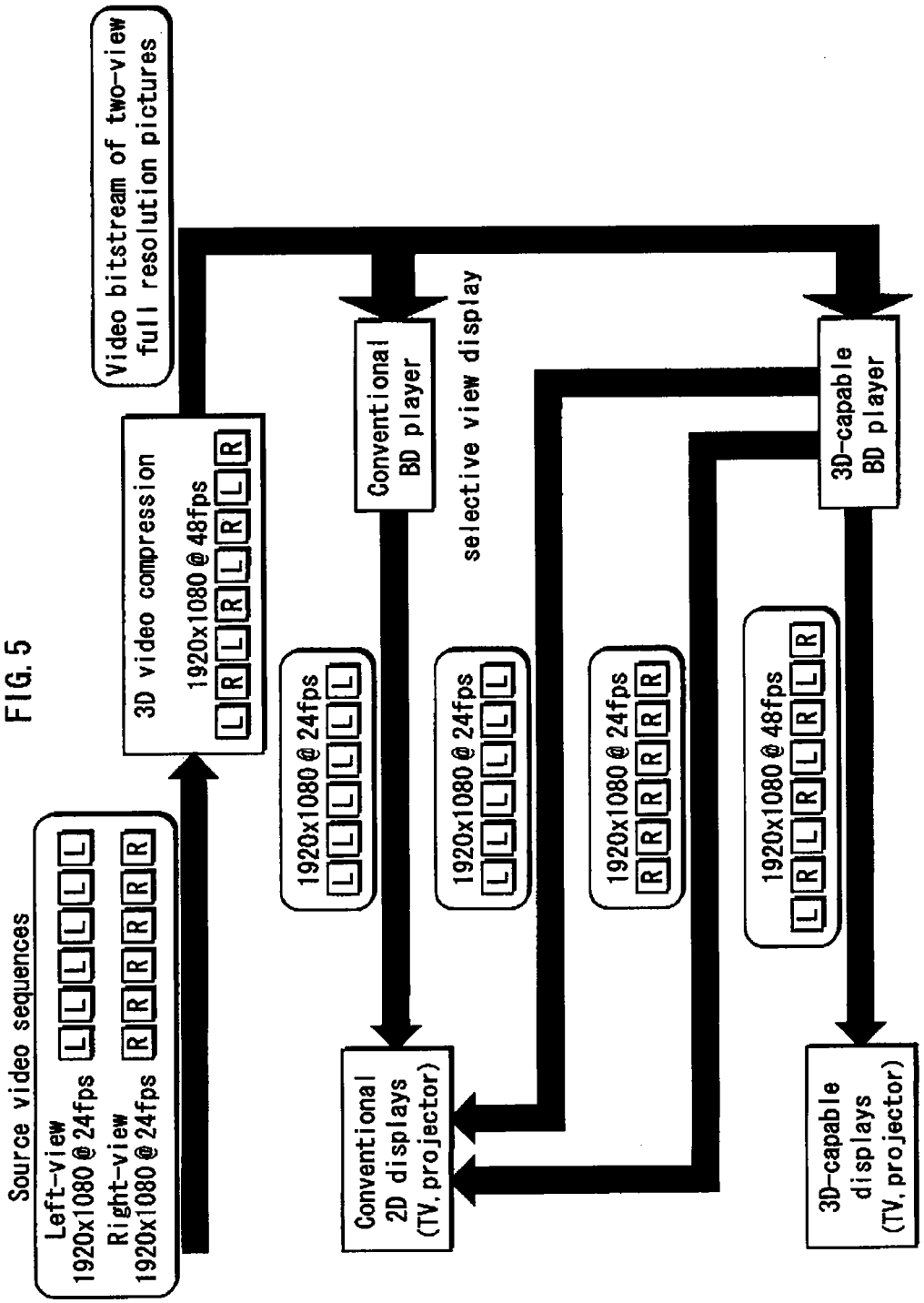
FIG. 5 shows the overview of a system.

FIG. 5 shows the overview of a system of an application using the present invention. Such a technique favorably solves the backward compatibility issue and improves coding efficiency in stereoscopic video compression. Furthermore, it allows the best quality 2D and 3D content to be contained in a single package or program. This technique ensures consumers to be able to use currently owned devices to play back future packaged media with enhanced features. As mentioned above, this technique significantly reduces production cost by eliminating necessity of making a separate high-definition 2D package of a 3D movie.

In all playback systems to which the present invention is applied, the picture size is not limited to 1920*1080 and video frame rate is not limited to 24 fps (frames per second) for each view. The receiver is not limited to BD player, and other playback devices are also applicable.

Figure 6:
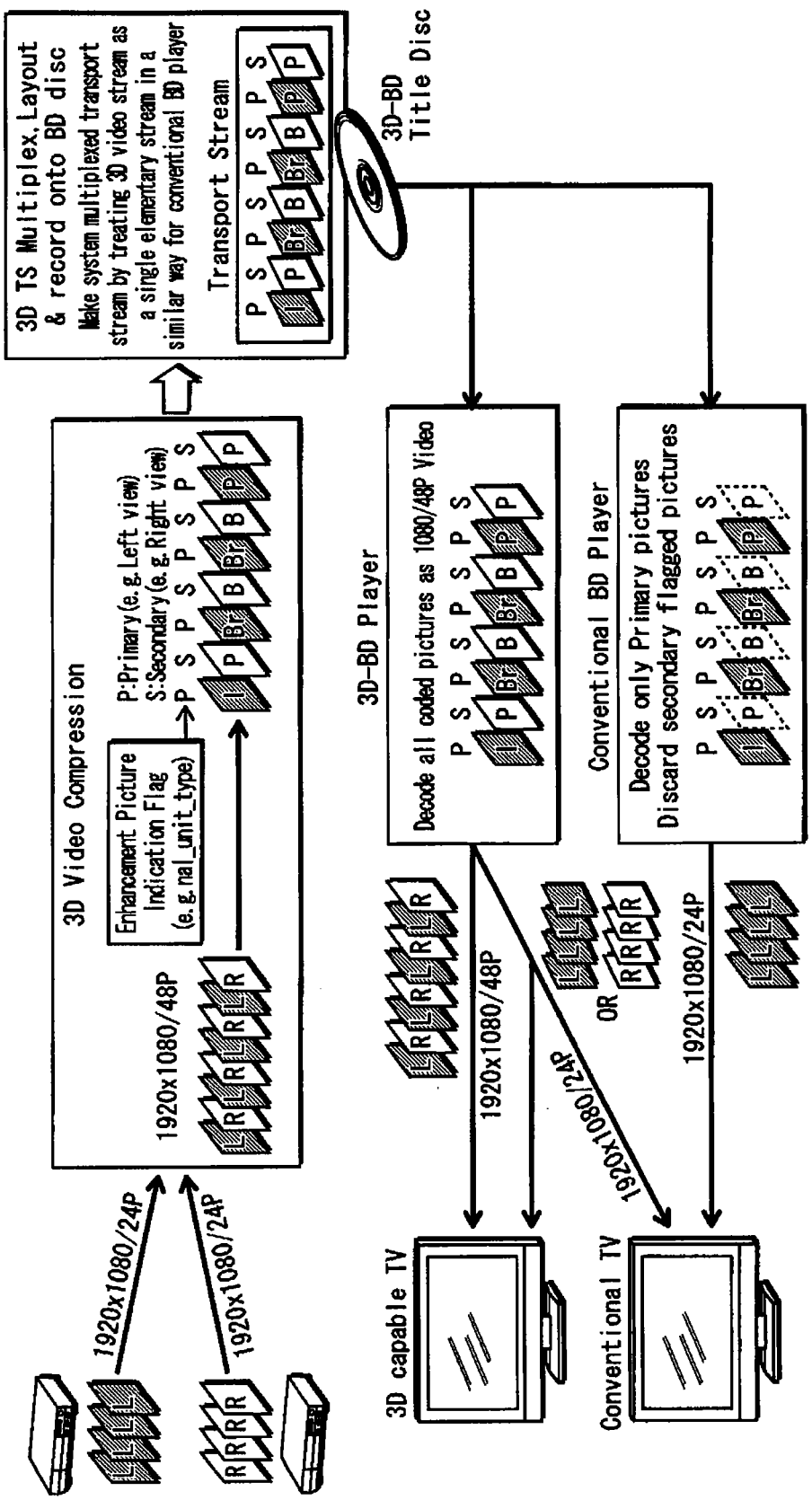
FIG. 6 shows a full HD 3D-BD system pertaining to the present invention.

FIG. 6 shows a full HD 3D-BD system (Step 1) pertaining to the present invention. With properly designed picture reference structures, all of the conventional video codecs in the BD-ROM specification can use the method for 3D video compression pertaining to the present invention. The 3D video elementary stream then goes through a multiplexing process which, considering doubled number of frames in the bitstream, generates a transport stream as input to authoring process. The 3D-BD disc pertaining to the present invention can be played back on a conventional BD player, which decodes only the primary pictures in full HD as input to a 2D moniror. When a 3D-BD player is available, the video sequences of both views are decoded in full HD, which can be displayed on a 3D-capable monitor, or either view is selected for display on a 2D monitor. This is the basic framework of a full-HD 3D-BD application denoted as "Step 1 (system which serves as basis for the following advanced design)."

At Step-1, the 3D stream is interleaved at frame/picture-level for the left and the right views. The multiplexing process maintains the interleaving pattern. However, in optical disc I/O, jump reading operation usually requires a minimum waiting time before it initiates a new reading operation. The playback duration of one frame is usually much smaller than the minimum waiting time. In order to achieve a maximum of 40 Mbps for video stream as specified in the BD-ROM Specification (Non-patent Literature 1), frame-level bitstream interleaving can not afford jump reading. In other words, a conventional BD player has to read in all the bytes of the stream including those of secondary view, which will be discarded prior to decoding. This will certainly limit the maximum input rate for the bitstream of primary view, which means that the primary view has to be encoded with a maximum input rate much lower than 40 Mbps. In this case, picture quality will be sacrificed as compared to the 2D-BD application case.

Figure 7:
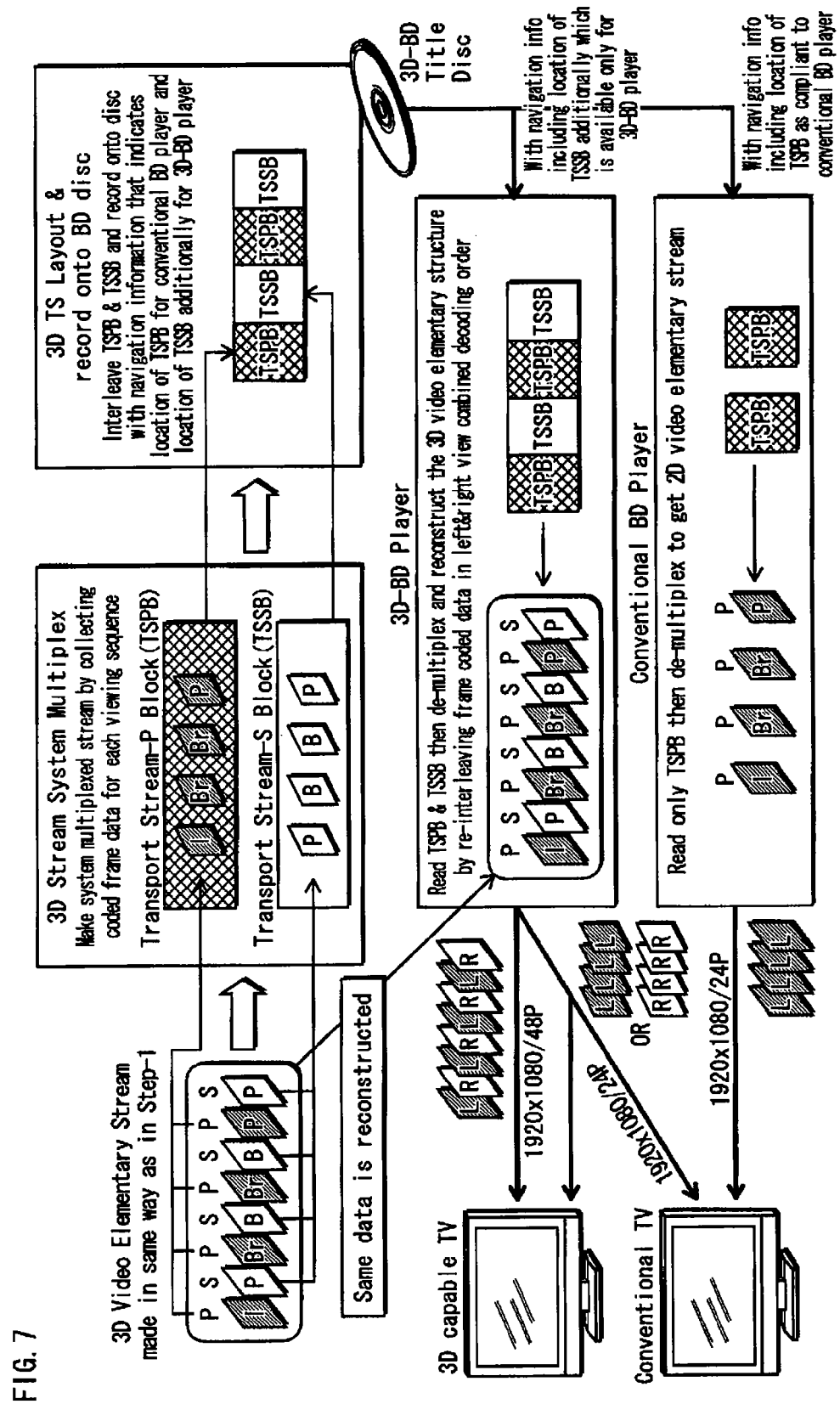
FIG. 7 schematically shows multiplexing 3D video streams in the full-HD 3D-BD system.

In order to solve this problem, the 3D video stream is re-organized and grouped to form larger data blocks. The details of the re-organization are described with reference to FIG. 7 showing multiplexing of a 3D video stream in the full HD 3D-BD system. The multiplexing process shown in FIG. 7 groups the bitstreams of multiple frames/pictures of each view into transport stream blocks, i.e., TSPB and TSSB which are for the primary and the secondary views, respectively. Each of the transport stream blocks contains a number of frames whose playback duration exceeds the minimum waiting time required for jump reading. The TSPBs and TSSBs are then interleaved and recorded onto a disc with navigation information that indicates the location of each transport stream block. A conventional BD player is guided by the navigation information to read only the TSPBs and then de-multiplexes those into primary video stream at a maximum 40 Mbps input rate. The conventional BD player, thus, plays back the full-HD 2D video with the highest picture quality as seen in conventional 2D-BD titles.

With the advances in optical disc technology, the disc reading speed has been greatly improved. It is possible to use a much higher maximum input rate for video streams. As a result, a 3D-capable BD player is able to read both the TSPBs and TSSBs, each of which can be encoded with the maximum input rate of 40 Mbps, to deliver the highest possible picture quality. At the de-multiplexing process shown in FIG. 7, the stream interleaved in the picture/frame-level is reconstructed for decoding. Then, display on either a 2D or 3D-capable monitor is feasible. Certainly, a 3D-capable BD player can also selectively play back either left- or right-eye pictures to output 2D video.

As above, the present invention can provide a new framework of coding stereoscopic video sequences with use of existing video coding standards. This technique can preserve the original resolution 3D video in compression. In addition, the present invention advantageously provides desirable compatibility with existing systems for 2D video compression. When deployed in broadcast services for 3D TV or packaged media for 3D movies, the technique pertaining to the present invention allows efficient reconstruction of original full resolution 3D or 2D video. According to the present invention, the best quality 3D and 2D video are both available on a single medium, which significantly saves production cost and provides simpler solution for customer to have 3D capable contents without concerning 3D capability of their home AV system environment. The technique pertaining to the present invention is applicable to any existing video coding standard with properly designed picture reference structures.

Figure 9A:
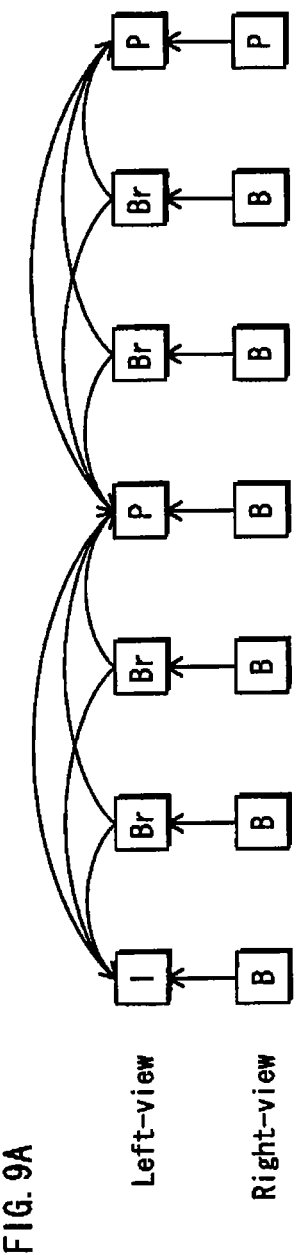
FIG. 9A shows another modification of the reference structure between pictures.
Figure 9B:
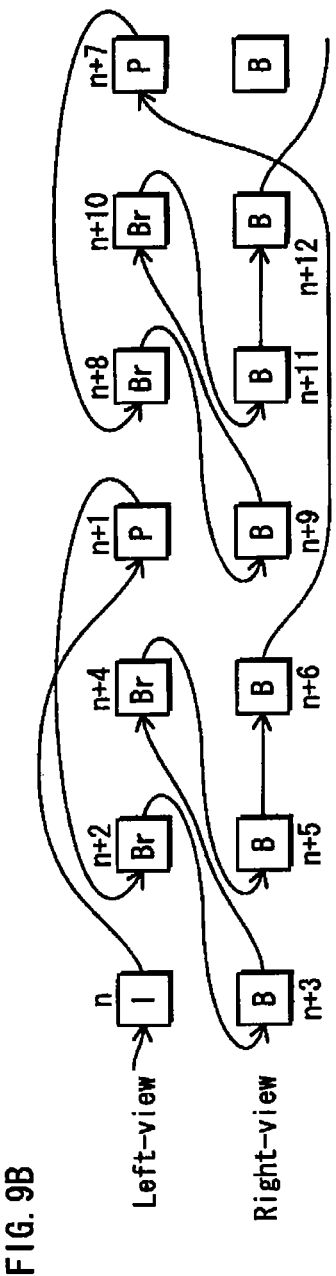
FIG. 9B shows the picture coding order shown by the arrows in the other modification.

Note that the image reference structure applied to the present invention has various modifications. FIG. 8A shows a modification of the reference structure between images. FIG. 8B shows coding order shown by the arrows in the modification of the image reference structure. FIG. 9A shows another modification of the reference structure between images. FIG. 9B shows coding order shown by the arrows in the other modification of the image reference structure. In particular, the structure shown in each of FIGS. 9A and 9B enables an existing BD player, without being modified, to play back an image of primary view (e.g. left-view) in full HD resolution. All the modifications of theses image reference structures are applicable to the video coding standard such as MPEG-4 AVC (Non-patent Literature 2) without undergoing improvements.

Embodiment 2

FIG. 10A shows a home theater system that can realize stereoscopic viewing. The home theater system of FIG. 10A has alternate-sequencing type stereo goggles 104 as accessories of a TV 103. There are mainly two techniques for realizing the stereoscopic viewing: one is a method using a holographic technique; and the other is a method using parallax video.

The feature of the holographic technique is that an object can be reproduced as human beings perceive a three-dimensional object. However, although a technical theory for generating moving images using the holographic technique has been established, a home theater system using the holographic technique is very difficult to be realized with the current techniques. This is because a computer performing an enormous amount of calculation for generating, in real time, moving images for holography and a display device with resolution enabling thousands lines to be drawn in 1 mm are required. Therefore, there are hardly any cases where such a home theater system using the holographic technique is commercially realized.

The advantage of the method using parallax video is that the stereoscopic viewing can be realized by only preparing images of two views that are for the right eye and the left eye. According to this method using parallax video, from the standpoint of how to show pictures of the right or the left eye to only the corresponding eye, several techniques including alternate-frame sequencing are in practical use.

To realize the stereoscopic viewing, alternate-sequencing type stereo goggles are used in the home theater system including a playback device and a TV. The alternate-sequencing type stereo goggles 104 are liquid crystal shutter glasses. With these goggles, a user is able to view parallax video generated by alternate-frame sequencing. The parallax video consists of a pair of a right-eye and a left-eye image. Showing only pictures of the right or left eye to the corresponding eye realizes stereoscopic viewing.

The alternate-frame sequencing is a method as follows. Images for the left eye and the right eye are alternately displayed in the time axis direction. Thus, an afterimage phenomenon occurred to the eyes causes the images for the right and left to seem to be overlaid each other, so that the viewer perceives the images as stereoscopic images.

FIG. 10B shows when left-eye video is being displayed. At the moment when left-eye video is displayed on the screen, the alternate-sequencing type stereo goggles 104 cause the liquid crystal shutter corresponding to the left eye to transmit light and the liquid crystal shutter corresponding to the right eye to block light. FIG. 10C shows when right-eye video is being displayed. At the moment when right-eye video is displayed on the screen, contrary to the aforementioned display of the left eye video, the alternate-sequencing type stereo goggles 104 cause the liquid crystal shutter corresponding to the right eye to transmit light and the liquid crystal shutter corresponding to the left eye to block light.

For example, to play back a normal 2D movie, 24 images are displayed per second. On the other hand, according to this method, to display the images for the right and the left eyes alternately in the time-axis direction, 48 images need to be displayed per second in total for both the right and left eyes. Accordingly, a display device capable of quickly executing rewriting of the screen is preferred for this method. This method can be applied to any display as long as a given number of rewriting can be executed per second.

According to the aforementioned method using the alternate-sequencing type stereo goggles 104, pictures for the right and left eyes are outputted alternately in the time-axis direction. On the other hand, there is another technique as follows. In the longitudinal direction of one screen, both pictures for the right and the left eyes are alternately arranged on the screen. Through a hog-backed lens called a lenticular lens provided on the surface of the display, pixels constituting the pictures for the left eye can be perceived only by the left eye, and pixels composing the pictures for the right eye can be perceived only by the right eye. Thus, the right and the left eyes perceive parallax pictures as three-dimensional images. Note that in addition to the lenticular lens, a device having the similar functions, such as a liquid crystal device, is also applicable. Also, a longitudinal polarizing filter may be provided for the pixels for the left eye, and a lateral polarizing filter may be provided for the pixels for the right eye. With the use of polarization glasses having the longitudinal polarizing filter for the left eye and the lateral polarizing filter for the right eye, a viewer sees stereoscopic images on a display. Note that, in addition to the longitudinal/lateral polarization method, the polarization method includes left hand circular polarization and right hand circular polarization. With the use of the circular polarization method, images can be separated for the right eye and the left eye regardless of inclination of the viewer's head. Accordingly, with the use of the polarized glasses provided with filters compliant with the method, more stable stereoscopic viewing is possible.

The stereoscopic viewing with the use of parallax video is already generally in use for attractions in an amusement park. Having been technically established, the stereoscopic viewing method using parallax video is most likely to be realized for household use. Note that various techniques, such as two-color separation method, are additionally proposed as the stereoscopic viewing using parallax video. Although in this embodiment, the alternate-frame sequencing method and the polarization glasses method are described as an example, other methods than these two are also applicable as long as parallax video are used.

In this embodiment, a description is given of a method for storing parallax video used for the stereoscopic viewing in an information recording medium. Here, a video image for a left screen is referred to as "left video image," a video image for the right screen is referred to as "right video image," and an image for both-eye screen is referred to as "stereoscopic video image."

The parallax video method achieves stereoscopic viewing by separately preparing video for the right and the left eyes and having only the pictures of the corresponding eye received by the eye.

Figure 11:
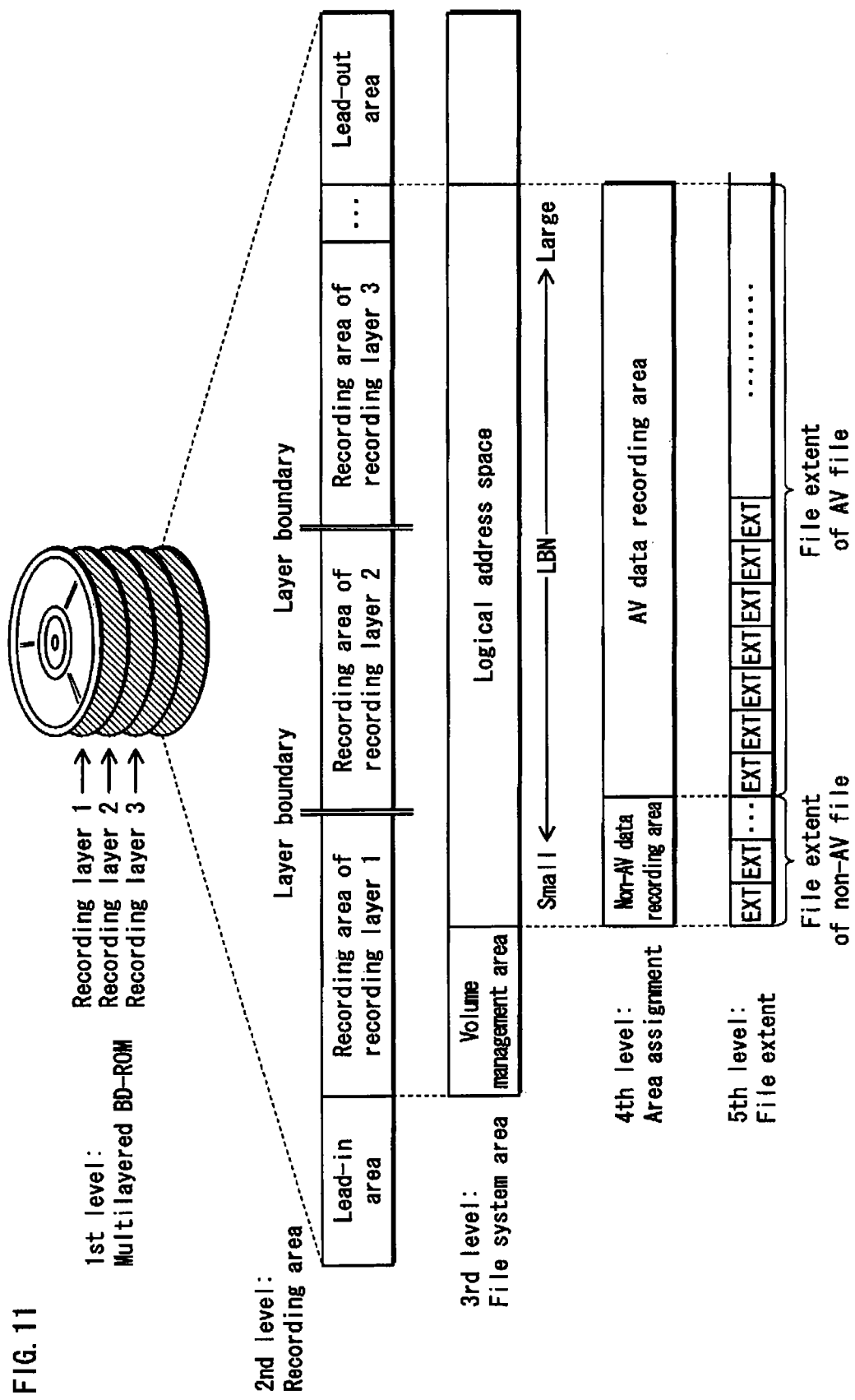
FIG. 11 shows the internal structure of the BD-ROM pertaining to the present invention.

FIG. 11 shows the internal structure of a BD-ROM 101 pertaining to the present invention.

The first level shows a multi-layered optical disc. The second level shows a spiral track on each of the recording layers depicted to extend in the horizontal direction. Each spiral track on the recording layer is treated as one consecutive recording area. This recording area has a lead-in area in the innermost circumference thereof, a lead-out area in the outermost circumference thereof, and recording areas of a first, a second and a third recording layer located between the lead-in area and the lead-out area. The recording areas of the first recording layer, the second recording layer, and the third recording layer compose one consecutive logical address space. A logical address space is an address space in which sectors are specified by consecutive logical block numbers. An area toward the inner circumference of the logical address space is a file system management area for managing the logical address space as a file system space.

The fourth level shows area assignment in the file system management area. The file system management area has a non-AV data recording area toward the inner circumference thereof, and an AV data recording area follows immediately after the non-AV data recording area. The fifth level shows recording content of the non-AV data recording area and the AV data recording area. The AV data recording area has extents constituting an AV file, and the non-AV data recording area has extents constituting a file other than the AV file.

Figure 12:
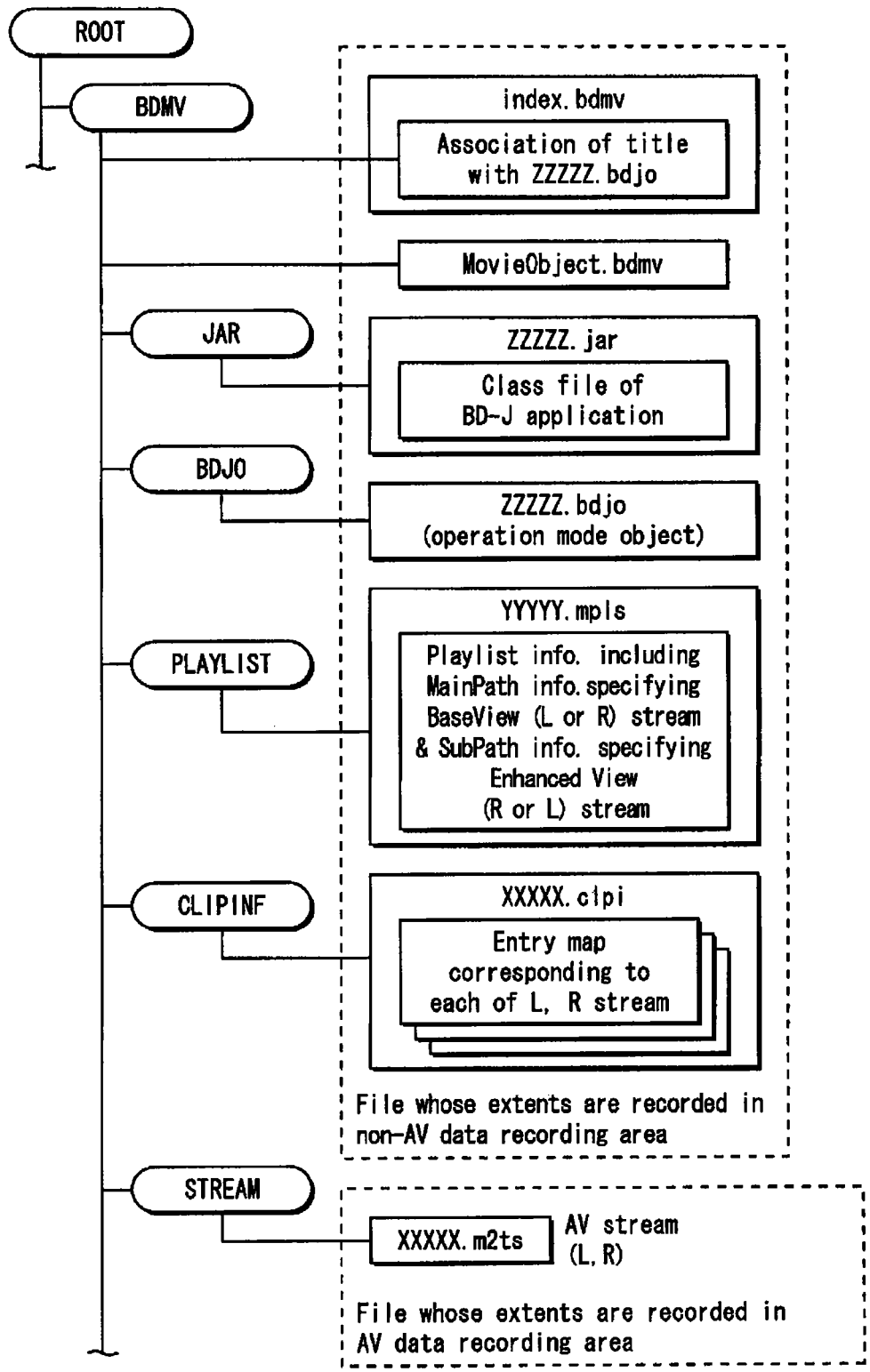
FIG. 12 shows an application format of the optical disc based on a file system.

FIG. 12 shows an application format of an optical disc based on the file system.

BDMV directory is a directory recording thereon data, such as AV content and management information, used by BD-ROM. Under the BDMV directory, there are five sub-directories called "PLAYLIST directory," "CLIPINF directory," "STREAM directory," "BDJO directory," and "JAR directory." In addition, under the BDMV directory, there are two types of files that are index.bdmv and MovieObject.bdmv.

The index.bdmv (fixed file name) is management information of the entire BD-ROM. After placement of a disc in the playback apparatus, index.bdmv is initially read so that the disc is uniquely identified by the playback apparatus. In addition, index.bdmv has a table associating a plurality of titles reproducible by the BD-ROM with BD-J objects defining the titles.

The MovieObject.bdmv (fixed file name) includes a scenario program, having described therein, a scenario to dynamically change the playback progress when each title is played back in HDMV mode (described later). "HDMV mode" is a playback mode unique in a playback environment unique to an AV equipment such as a DVD.

The JAR directory has a file with an extension jar (xxxxx.jar ["xxxxx" is variable, and extension "jar" is fixed]).

The BDJO directory has a file with an extension bdjo (xxxxx.bdjo ["xxxxx" is variable, and extension "bdjo" is fixed]). A file with an extension "bdjo" is a file storing therein a BD-J object indicating a dynamic scenario in "BD-J mode" that is a playback mode mainly used by a JAVA™ virtual machine.

The PLAYLIST directory has a file with an extension mpls (xxxxx.mpls ["xxxxx" is variable, and extension "mpls" is fixed]).

The CLIPINF directory has a file with an extension clpi (xxxxx.clpi ["xxxxx" is variable, and extension "clpi" is fixed]).

Extents constituting files located in the above directories are recorded in the non-AV data recording area.

The STREAM directory is a directory storing therein a file that is, so to speak, a main body of a digital stream. The STREAM directory has a file whose extents are to be recorded in the AV stream recording area, which is a file with an extension xxxxx.m2ts as shown in FIG. 11 (["xxxxx" is variable, and extension "m2ts" is fixed]).

Figure 13:
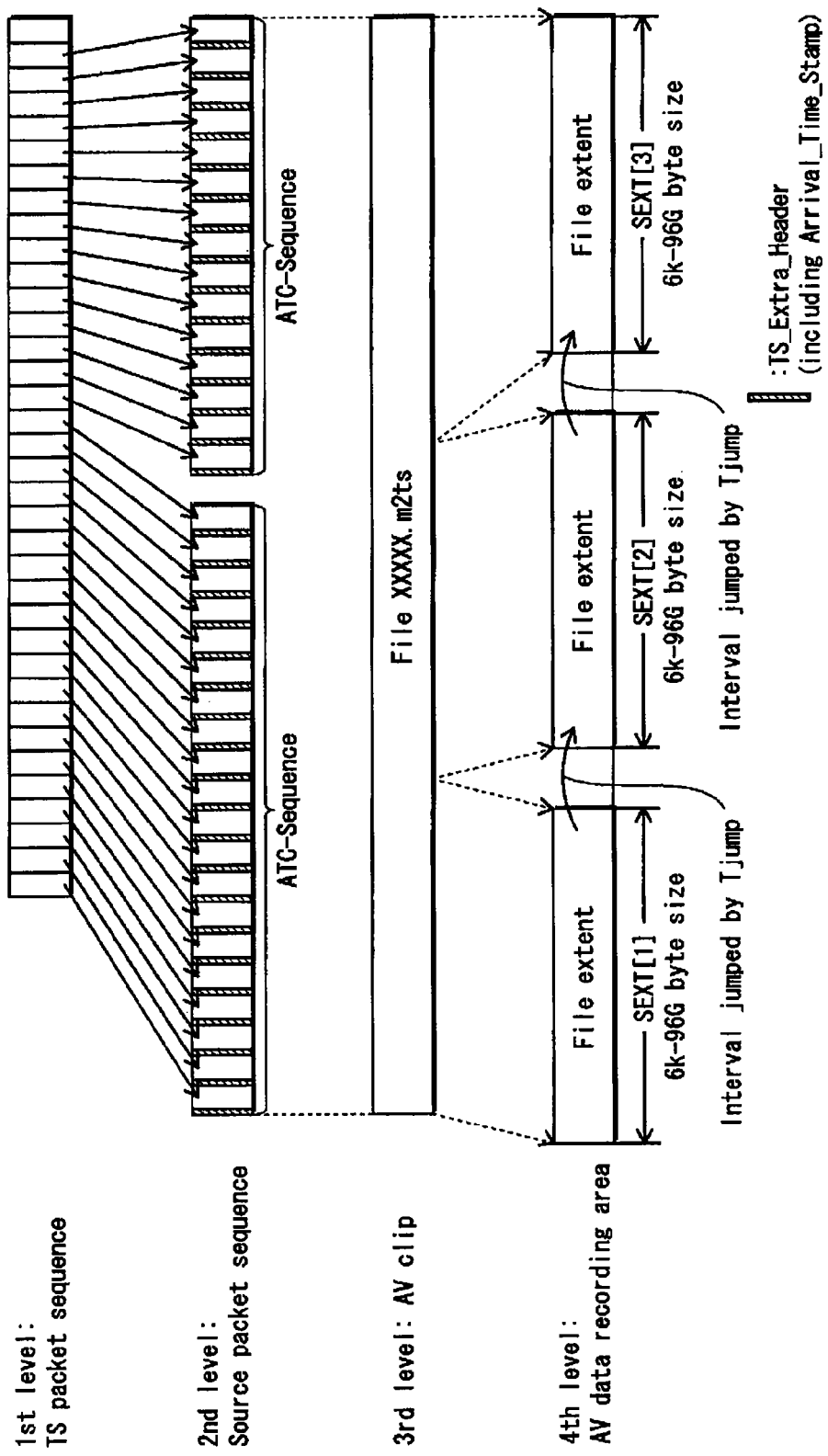
FIG. 13 shows a process for writing each of source packets constituting a base view and an enhanced view in the respective recording layer.

Subsequently, a description is given of how source packets constituting a base view and an enhanced view are written in each recording layer. FIG. 13 shows a process for writing source packets constituting a base view and an enhanced view in the respective recording layer. The first level in FIG. 13 shows TS packets constituting the base view and the enhanced view.

As shown in the second level, 4 byte TS_extra_header (hatching in FIG. 13) is appended to each of 188-byte TS packets constituting an AV clip. Thus, each source packet has a 192-byte length. The TS_extra_header includes Arrival_Time_Stamp that indicates input time information of the TS packet inputted to a decoder.

The source packets of the AV clip constitute at least one "ATC_Sequence" in the third level. The "ATC_Sequence" is a sequence of source packets constituting the time axis of ATS, and has no discontinuity (no arrival time-base discontinuity) in Arrival_Time_Clock referred to by the Arrival_Time_Stamp. In other words, a source packet sequence where the source packets are continuous in the Arrival_Time_Clock referred to by the Arrival_Time_Stamp is called "ATC_Sequence." ATS is attached to the top of each TS packet as shown below and indicates a transfer time to a decoder.

Such ATC_Sequence constitutes an AV Clip, and the AV clip is recorded in the recording layer as a file name xxxxx.m2ts.

Similar to a normal computer file, such an AV clip is divided into one or more file extents and they are recorded in an area of each recording layer. The third level shows the AV clip. The fourth level schematically shows how the AV clip is recorded in each recording layer. Each of file extents constituting the file in the fourth level has a data length longer than a predetermined Sextent.

Figure 14:
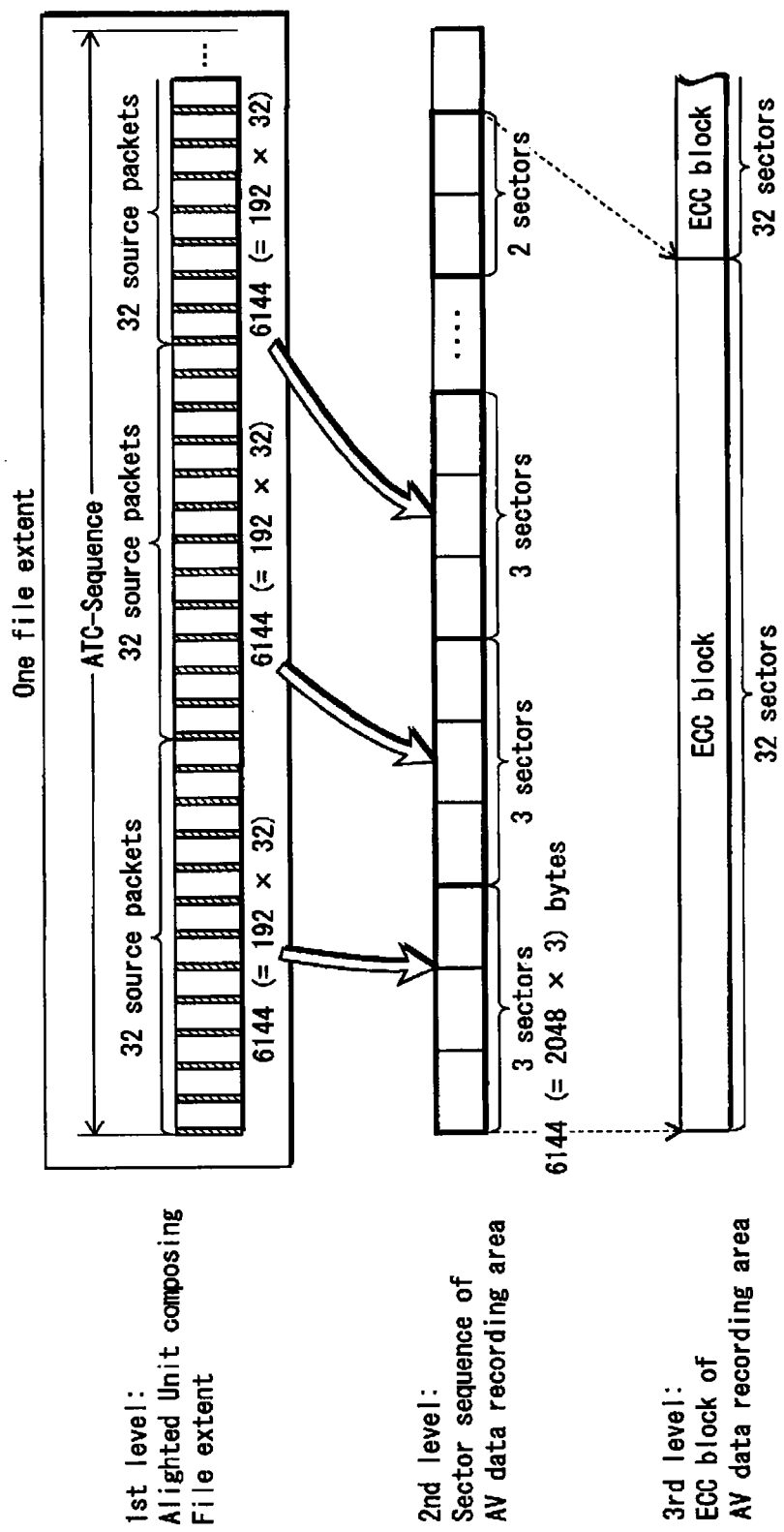
FIG. 14 shows how a file extent is written in the recording layer.

As shown in FIG. 14, each file extent is constituted from a group of 32 source packets, and the groups are written in the consecutive three sectors. A group of 32 source packets amounts to 6144 bytes (=32*192), and coincides with the size of the three sectors with 6144 bytes (=2048*3). A group of 32 source packets contained in three sectors is referred to as "Aligned Unit." Source packets are written in a BD-ROM in units of the Aligned Units. This completes the description is given of the process of writing the AV clip in each recording layer.

FIG. 15 shows a plurality of possible value ranges of packet IDs of TS packets, and their respectively associated PES stream types having packet IDs in the value ranges.

TS packets each having a packet ID 0x0100 constitute Program_map. TS packets each having a packet ID 0x1001 constitute PCR.

TS packets each having a packet ID 0x1011 constitute a base view video stream. TS packets each having a packet ID 0x1012 constitute an enhanced view video stream.

TS packets each having a packet ID in a range from 0x1100 to 0x111F, inclusive, constitute a primary audio stream.

Figure 16:
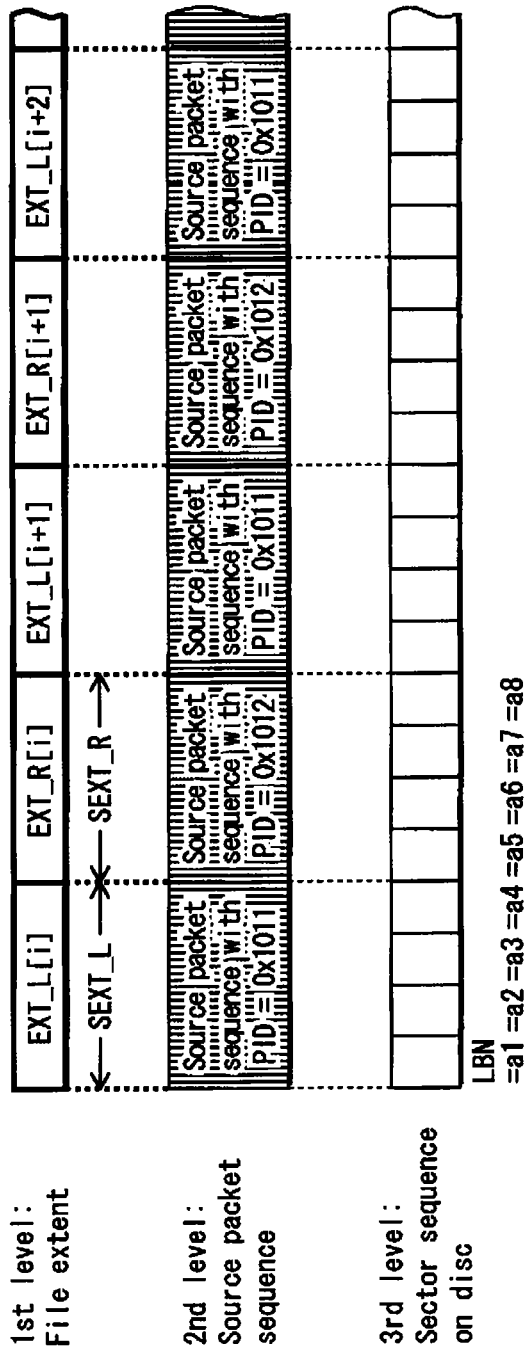
FIG. 16 shows interleaved arrangement of file extents.

TS packet sequences constituting a base view and an enhanced view are arranged in an interleaved manner in each file extent. FIG. 16 shows the interleaved arrangement of the file extents. The interleaved arrangement in FIG. 16 means that extents constituting a base view and an enhanced view are arranged with regularity in the order of a base view, an enhanced view, a base view, an enhanced view . . . .

The first level shows extents constituting the AV file. The second level shows a source packet sequence in each extent. The third level shows a sector sequence in the recording layer.

It can be seen that each of extents EXT_L[i] and EXT_L [i+1] has a data length SEXT_L and is constituted from source packets with PID=1011. Each of extents EXT_R[i] and EXT_R[i+1] has a data length SEXT_R and is constituted from source packets with PID=1012.

Figure 17:
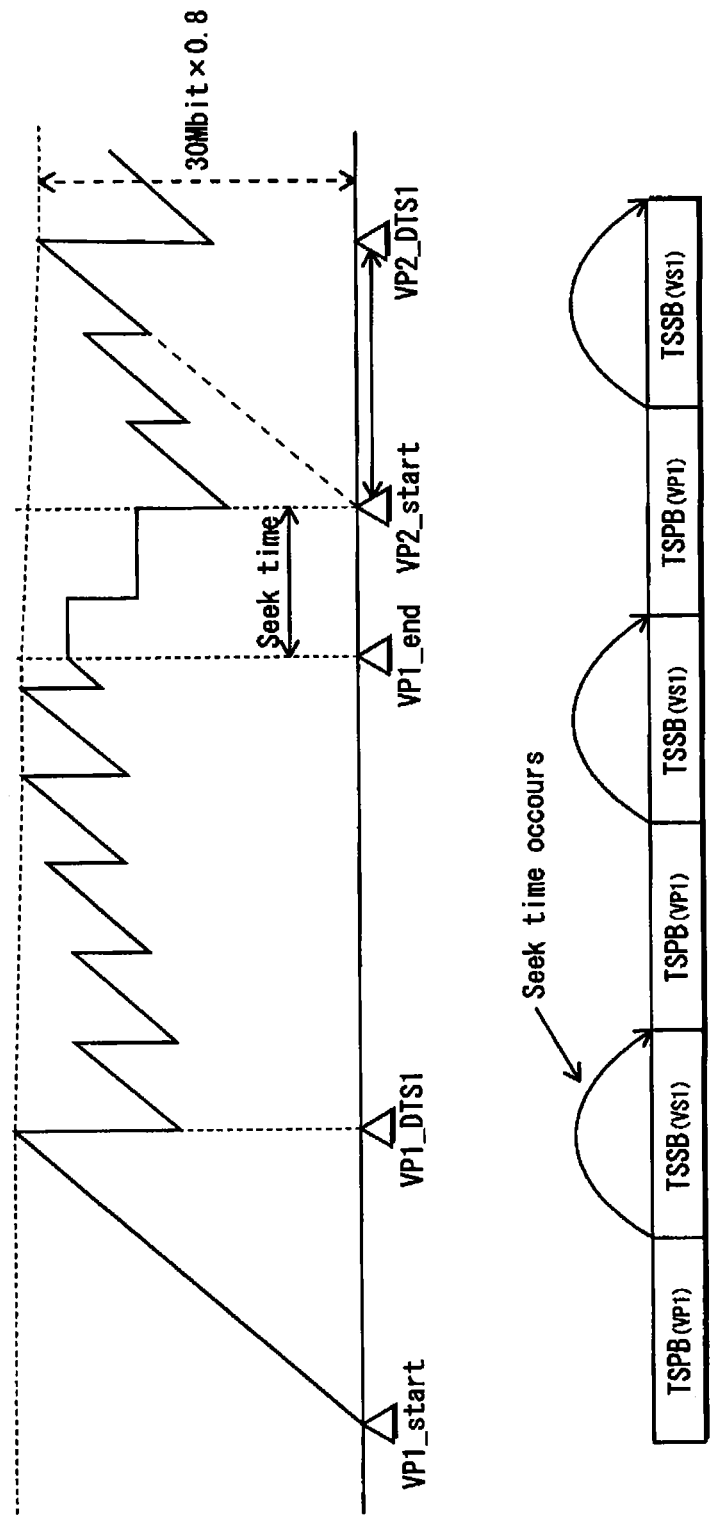
FIG. 17 shows a condition for defining the size of SEXTNT.

SEXT_L and SEXT_R, which is a data length of each file extent, is described with reference to FIG. 17. To read an AV stream from the BD-ROM pertaining to the present invention, a conventional playback device incapable of stereoscopic video playback reads out only TSPBs, which are file extents of a base view, and does not read TSSBs, which are file extents of an enhanced view. As a result, as shown in the lower level of FIG. 17, according to the conventional playback device, a seek time occurs during playback for jumping TSSBs that are interleaved with TSPBs. Therefore, the data length SEXT_L is set to be a value larger than the data size that does not cause a buffer, which holds TSPBs having been read out before the occurrence of seek, to underflow during the seek time.

Figure 18:
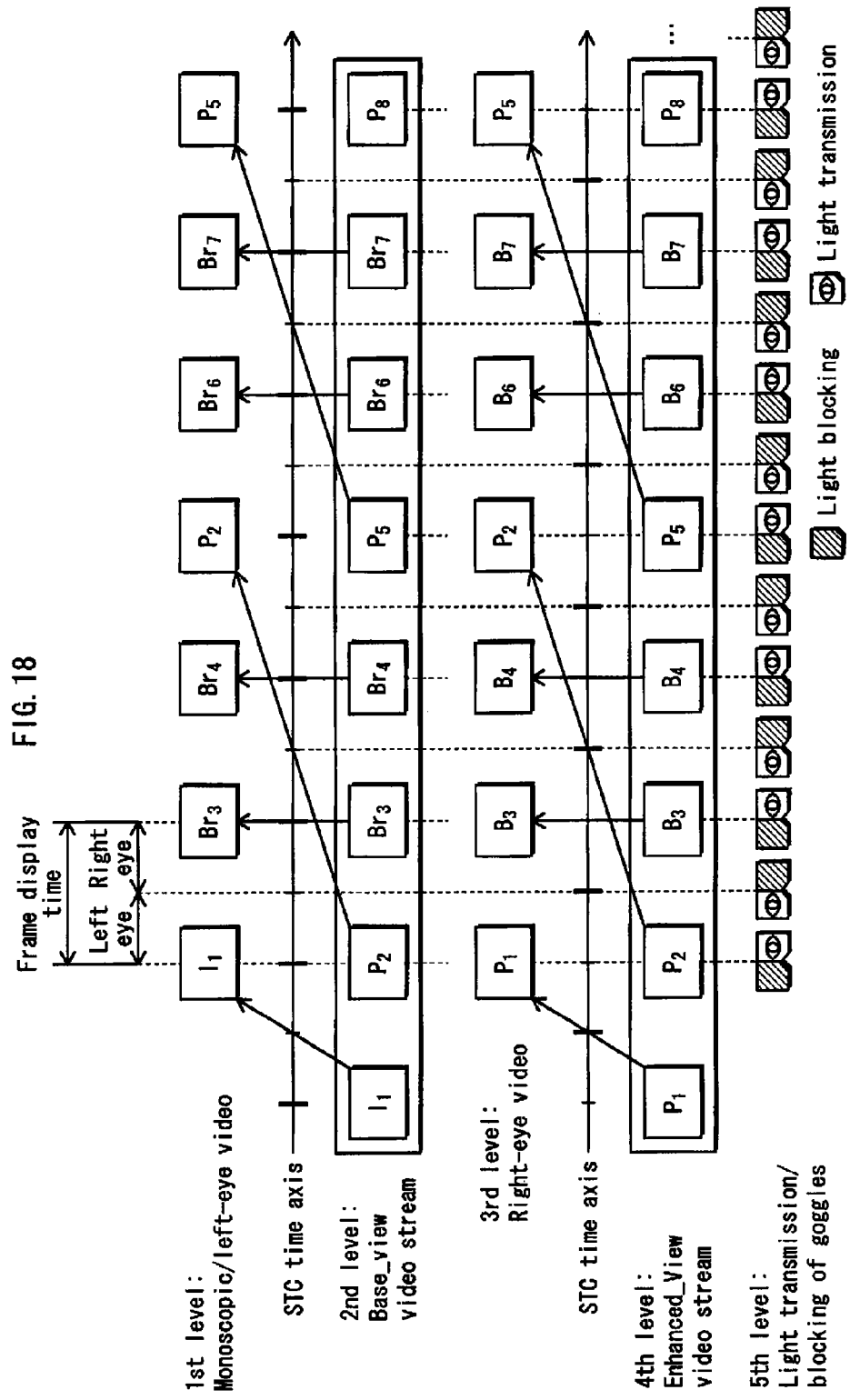
FIG. 18 shows an example of the internal structure of each of a base view stream and an enhanced view stream for stereoscopic viewing.

FIG. 18 shows an example of the internal structure of each of a base view stream and an enhanced view stream for stereoscopic viewing.

The second level in FIG. 18 shows the internal structure of the base view stream. This base view stream contains picture data I1, P2, Br3, Br4, P5, Br6, Br7, and P8. The picture data is decoded in accordance with DTS. The first level shows left-eye images. The decoded picture data I1, P2, Br3, Br4, P5, Br6, Br7, and P8 is played back in accordance with PTS in the order of I1, Br3, Br4, P2, Br6, Br7, and P5, so that the left-eye images are played back.

The fourth level shows the internal structure of the enhanced view stream. This enhanced view stream contains picture data P1, P2, B3, B4, P5, B6, B7, and P8. The picture data is decoded in accordance with DTS. The third level shows right-eye images. The decoded picture data P1, P2, B3, B4, P5, B6, B7, and P8 is played back in accordance with PTS in the order of P1, B3, B4, P2, B6, B7, and P5, so that the right-eye images are played back.

The fifth level shows how the state of the sequential-type goggles 104 is changed. The fifth level shows that while a left-eye image is viewed, the right-eye shutter is closed and that while a right-eye image is viewed, the left-eye shutter is closed.

The base view video stream and the enhanced view video stream are compressed by inter-picture predictive coding taking advantage of redundancy between viewpoints in addition to temporal redundancy. A picture of a right-eye video stream is compressed with reference to a picture of a monoscopic/ left-eye video stream that is displayed at the same time as the corresponding picture of the right-eye video stream.

For example, the first P picture of the right-eye video stream refers to an I picture of the monoscopic/left-eye video stream, a B picture of the right-eye video stream refers to a Br picture of the monoscopic/left-eye video stream, and the second P picture of the right-eye video stream refers to a P picture of the monoscopic/left-eye video stream.

<Clip Information File>

Figure 19:
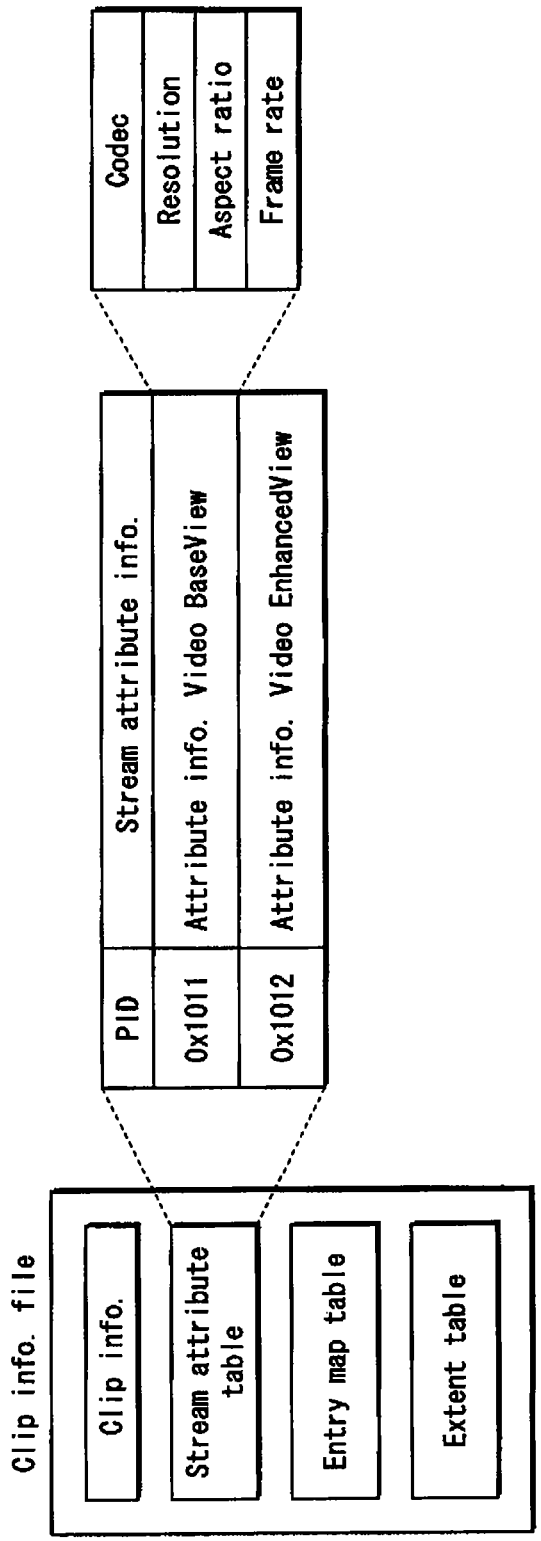
FIG. 19 shows an example of a clip information file.

FIG. 19 shows an example of a clip information file. As shown in FIG. 19, the clip information file is management information of an AV clip. The clip information file is in one to one correspondence with an AV clip, and includes stream attribute information and an entry map.

As shown in FIG. 19, the stream attribute information of each stream in the AV clip is registered for each PID. Each piece of attribute information has different information depending on whether the corresponding stream is a base view video stream or an enhanced view video stream.

The internal structure of the stream attribute information is closed up with the leader lines. As shown with the leader lines, the stream attribute information indicates what attributes PES streams each constituted from a different type of TS packets shown in FIG. 19 have. The stream attribute information indicates, for example, stream attribute information of a base view constituted from TS packets with PID=0x1011 and stream attribute information of an enhanced view constituted from TS packets with PID=0x1012.

An extent table includes extent_start_point, and indicates a start address of a file extent in each 6 KB unit. This is because file extents are aligned in every 6 KB. The start address can be specified up to 96 GB in 24 bits. The extent_start_point is an address relative to the top of the file. The extent start point can be stored in the Clip management information.

Subsequently, a description is given of the internal structure of an entry map table.

An entry map is a table showing, on the STC time axis identified by a certain packet ID, the correspondence between a source packet number of an arbitrary source packet and a PTS on the STC time axis.

The STC time axis is referred to as "STC Sequence." The STC sequence is a time axis of MPEG2-TS used to indicate a decode time and a display time, and is a section where there is no discontinuity (system time-base discontinuity) of STC (System Time Clock) which is a system reference time of the AV stream. The STC is discontinuous where the discontinuity information (discontinuity_indicator) of a PCR packet carrying PCR (Program Clock Reference) referred to by a decoder to obtain STC is ON.

FIG. 20A shows the internal structure of an entry map table. The internal structure of the entry map table is closed up with the leader lines.

As shown with the leader lines, an entry map table includes an entry map of a base view stream constituted from TS packets with PID=0x1011 and an entry map of an enhanced view stream constituted from TS packets with PID=0x1012. Thus, PES streams constituted from a plurality of types of TS packets shown in FIG. 20A each have an entry map. In an entry map, information of a pair of PTS and SPN is referred to as an "entry point." A value of each entry point incremented from the top of the entry map being 0 is referred to as entry point ID (hereinafter, referred to as EP_ID). With the use of the entry map, a playback device is able to specify the location of a source packet corresponding to an arbitrary point on the time axis of the video stream. For example, in special playback such as forwarding and rewinding, a playback device can execute efficient processing by specifying and selecting an I picture registered in the entry map without analyzing the AV clip. Also, an entry map is made for each of the video streams multiplexed in the AV clip, and is managed by a PID.

The internal structure of an entry map with regard to PID=1011 is closed up with the leader lines. The entry map is constituted from an entry point corresponding to EP_ID=0, an entry point corresponding to EP_ID=1, an entry point corresponding to EP_ID=2, and an entry point corresponding to EP_ID=3. The entry point corresponding to EP_ID=0 shows correspondence between SPN=3 and PTS=80000. An entry point corresponding to EP_ID=1 shows correspondence between SPN=1500 and PTS=270000.

The entry point corresponding to EP_ID=2 shows correspondence between SPN=3200 and PTS=360000. The entry point corresponding to EP_ID=3 shows correspondence between SPN=4800 and PTS=450000.

FIG. 20B shows which source packets are identified by a plurality of entry points in the entry map corresponding to TS packets with PID=1011 shown in FIG. 20A. An entry point corresponding to EP_ID=0 indicates SPN=3, and associate this source packet number with PTS=80000. An entry point corresponding to EP_ID=1 indicates SPN=1500, and associates this source packet number with PTS=270000.

An entry point corresponding to EP_ID=2 indicates a source packet with SPN=3200, and associates this source packet number with PTS=360000. An entry point corresponding to EP_ID=3 indicates a source packet with SPN=4800, and associates this source packet number with PTS=450000.

Figure 21:
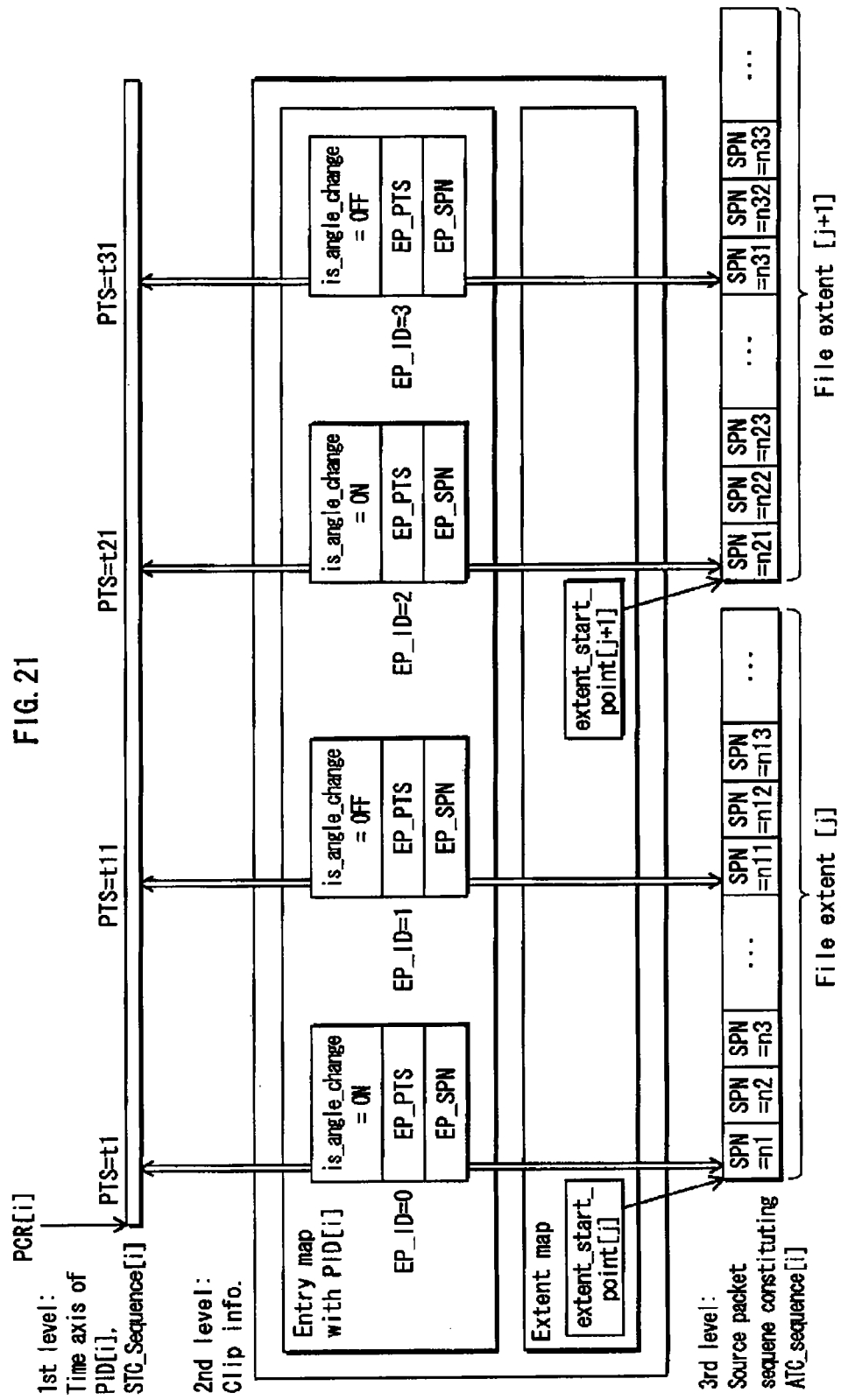
FIG. 21 shows registration of entry points by the entry map.

FIG. 21 shows registration of entry points in an entry map. The first level shows a time axis defined by an STC sequence. The second level shows an entry map and an extent point map in the clip information. The third level shows source packet sequences constituting the STC sequence. When an entry point specifies a source packet=n1 in the ATC sequence, PTS in this entry point is set as PTS=t1 in the STC sequence. Thus, with the use of the time point PTS=t1, a playback device can execute random access from spn=n1 in the ATC sequence. Also, when the entry point specifies a source packet=n21 in the ATC sequence, PTS in the entry point is set as PTS=t21 in the STC sequence. Thus, with the use of the time point PTS=t21, a playback device can randomly access from spn=n21 in the ATC sequence.

Figure 22:
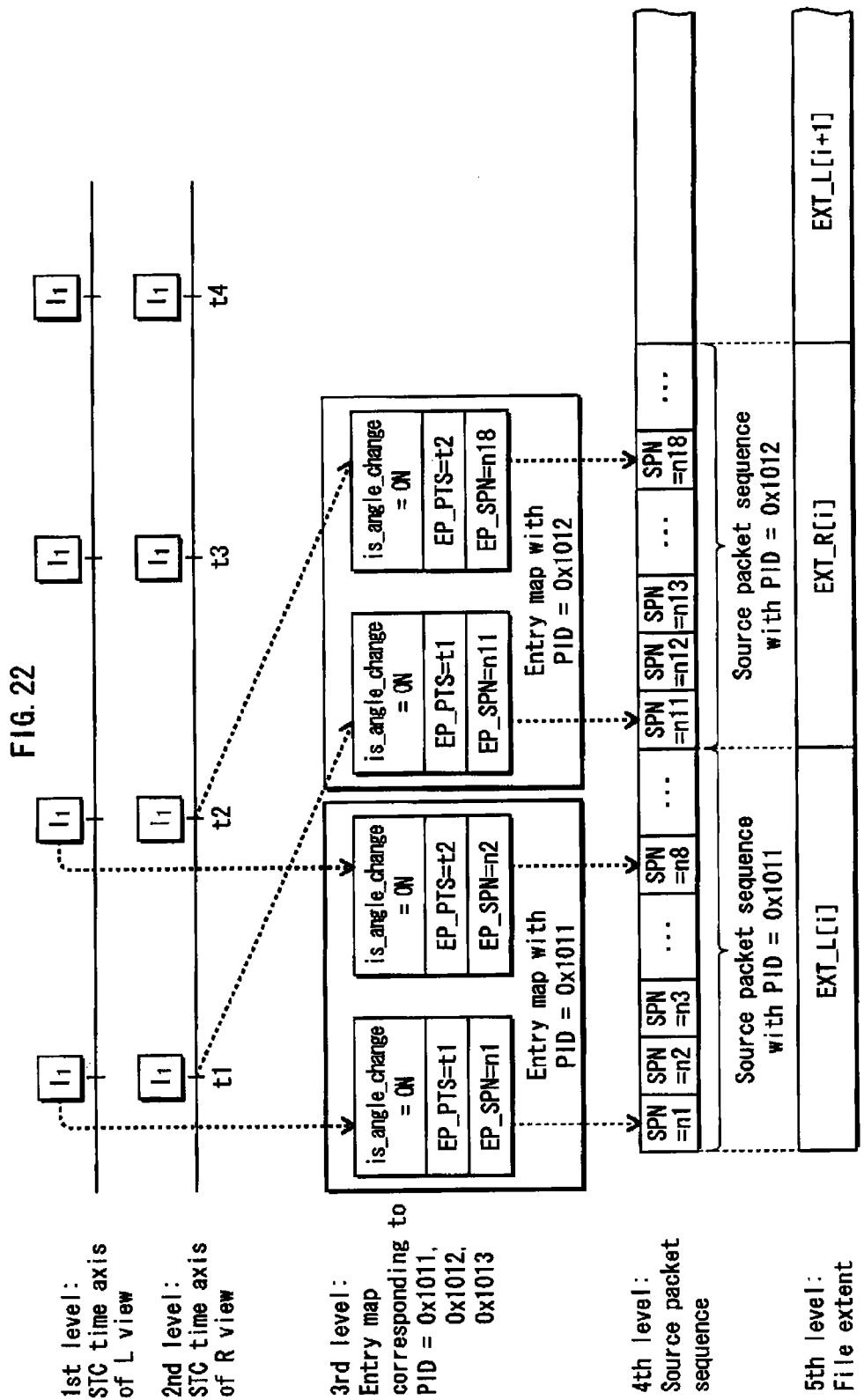
FIG. 22 shows how the entry points in the entry maps corresponding to a base view and an enhanced view are set.

FIG. 22 shows how entry points in the entry maps corresponding to a base view and an enhanced view are set. The correspondence in FIG. 22 is as follows. A source packet number in the STC sequence is described in a source packet number in each entry point in the entry map, and a PTS in the STC sequence is described in a PTS of each entry point in the entry map. FIG. 22 shows how source packets on the time axis are associated with the time axis in the entry map.

The extents shown in the fourth level and the fifth level are extents of a base view and an enhanced view that are recorded in an interleaved manner, and they are the same as those shown in FIG. 21. The third level shows entry maps corresponding to PID=1011 and 1012. The entry map corresponding to PID=1011 includes an entry point indicating n1 and an entry point indicating n8. These entry points show the correspondence between t1 and t2 on the STC time axis. The entry map corresponding to PID=1012 includes an entry point indicating n11 and an entry point indicating n18. These entry points show the correspondence between t1 and t2 on the STC time axis.

Thus, though the extents of the base view and the enhanced view streams that are to be played back at the same playback point on the time axis are recorded at different locations in the AV data recording area, with the use of the entry map associated with each stream, a source packet at the top of the extents of each of the base view and the enhanced view streams is uniquely accessed by PTS.

Here, according to a conventional playback device incapable of stereoscopic video playback, with reference to the entry map with regard to PID=1011, an extent that is a TSPB in the AV data can be accessed. On the other hand, according to a playback device capable of stereoscopic video playback, with reference to the entry map with regard to PID=1012 in addition to an entry map with regard to PID=1011, both extents TSPB and TSSB in AV data can be accessed. Thus, an entry map with regard to PID=1011 corresponds to the base location information in the navigation information pertaining to the present invention, and an entry map with regard to PID=1012 corresponds to the enhanced location information included in the navigation information pertaining to the present invention.

<Playlist Information>

Figure 23:
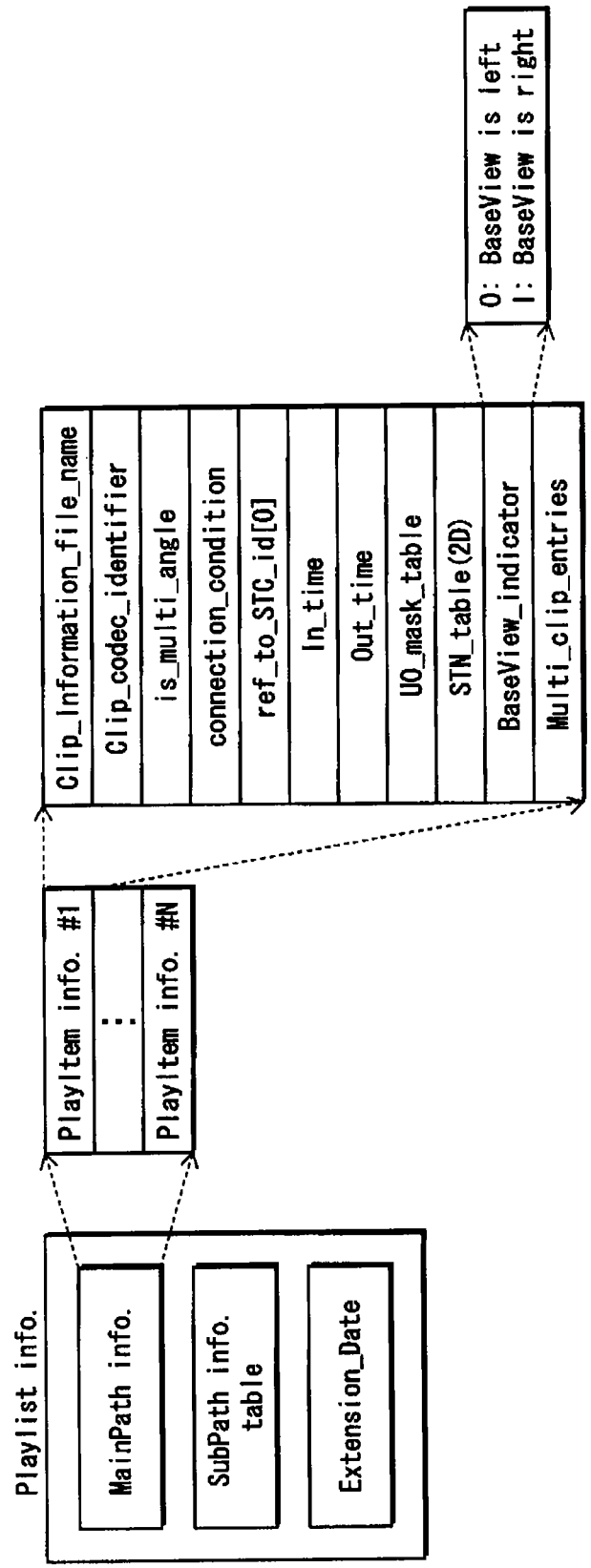
FIG. 23 shows the data structure of PlayList information.

FIG. 23 shows the data structure of PlayList information. In FIG. 23, as shown with the leader lines, the PlayList information includes MainPath information (MainPath) defining MainPath, a subpath information table defining Subpath and Extension_Data.

First, a description is given of MainPath. MainPath is a playback path defined for a main video stream and a main audio stream.

As shown by the arrows, a MainPath is defined by a plurality of pieces of PlayItem information #1 to #N. The PlayItem information defines one logical playback section constituting the MainPath. The structure of the PlayItem information is closed up with the leader lines. As shown with the leader lines, the PlayItem information is constituted from "Clip_Information_file_name," "Clip_codec_identifier," "is_multi_angle," "connection_condition," "ref_to_STC_id [0]," "In_time," "Out_time," "UO_mask_table," "STN_table (2D)," "BaseView_indicator" and "Multi_clip_entries." The "Clip_Information_file_name" indicates a file name of playback section information of the AV clip to which IN point and OUT point of the playback section belong. The "Clip_codec_identifier" indicates a coding scheme of the AV clip. The "is_multi_angle" indicates whether the PlayItem relates to multiangle. The "connection_condition" indicates a connection condition between this PlayItem (current PlayItem) and the previous PlayItem (previous PlayItem). The "ref_to_STC_id[0]" uniquely identifies STC_Sequence corresponding to the PlayItem. The "In_time" is time information showing the start point of the playback section. The "Out_time" is time information showing the end point of the playback section. The "UO_mask_table" indicate which of user operations to be masked in the PlayItem. The playback path is constituted from a pair of the time information "In_time" showing the start point of the playback section and the time information "Out_time" showing the end point. The playback path information is constituted from the pair of "In_time" and "Out_time."

When the "BaseView_indicator" indicates 0, BaseView is for Left. When it indicates 1, BaseView is for Right.

The "STN_table(2D)" is an STN table read out by a conventional BD-ROM playback device, and includes a video stream no. table that indicates PIDs of TS packets constituting a video stream. Generally, an STN table is a table in which a stream number is assigned to a pair of a packet ID and a stream attribute. The order of pairs of a packet ID and a stream attribute in the STN_table shows the priority of the corresponding stream.

Figure 24:
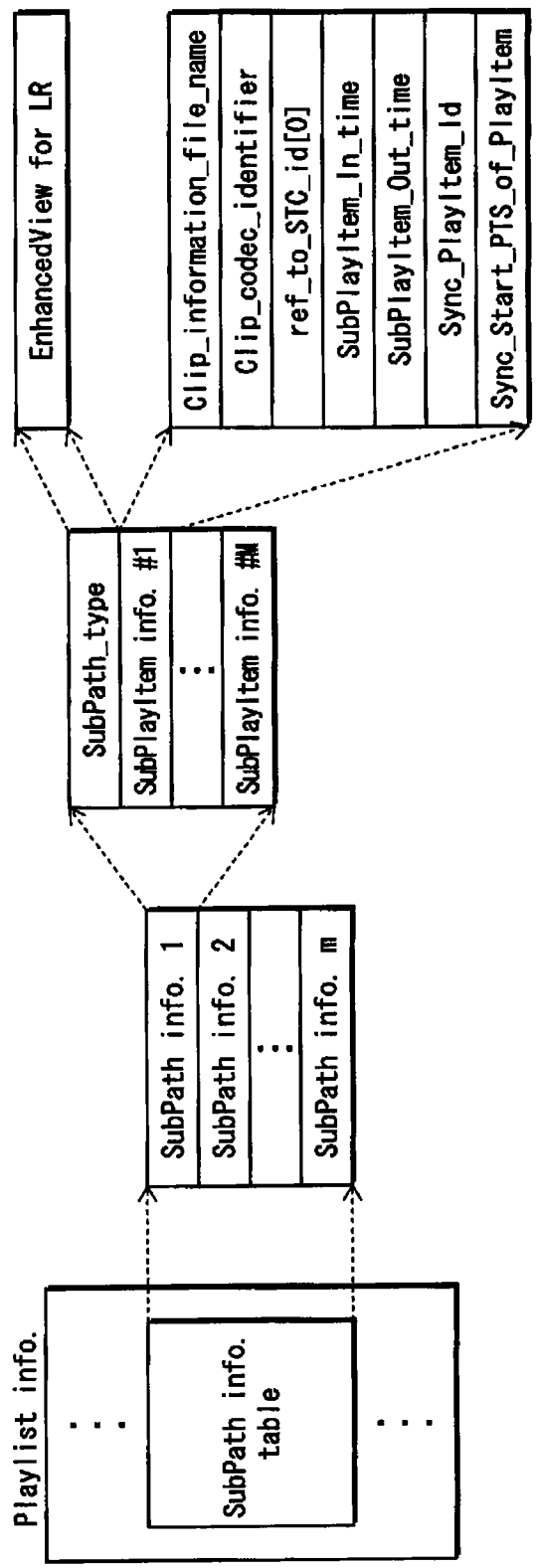
FIG. 24 shows a close-up of the internal structure of a subpath information table.

FIG. 24 shows a close-up of the internal structure of a subpath information table. The table includes a plurality of pieces of subpath information. These pieces of the subpath information are a plurality of instances derived from a single class structure, and have the common internal structure. The common internal structure of the Subpath information is closed up with the leader lines. As shown by the arrows in FIG. 24, each piece of the Subpath information includes SubPath_type indicating a type of the subpath and one or more pieces of SubPlayItem information ( . . . SubPlayItem( ) . . . ). As shown by the arrows in FIG. 24, the SubPlayItem information is constituted from "Clip_information_file_name," "Clip_codec_identifier," "ref_to_STC_id [0]," "SubPlayItem_In_time," "SubPlayItem_Out_time," "sync_PlayItem_id," and "sync_start_PTS_of_PlayItem." A description is given of the internal structure of SubPlayItem below.

The "Clip_information_file_name" is information that uniquely identifies a SubClip corresponding to SubPlayItem with a file name described in the clip information.

The "Clip_codec_identifier" identifies a coding scheme of an AV clip.

The "ref_to_STC_id[0]" uniquely identifies STC_Sequence corresponding to SubPlayItem.

The "SubPlayItem_In_time" is information identifying the start point of SubPlayItem on the playback time axis of SubClip.

The "SubPlayItem_Out_time" is information indicating the end point of SubPlayItem on the playback time axis of SubClip.

The "sync_PlayItem_id" is information uniquely identifying a PlayItem constituting MainPath that are to be synchronized with the SubPlayItem. The SubPlayItem_In_time is on the playback time axis of PlayItem identified by the sync_PlayItem_id.

The "sync_start_PTS_of_PlayItem" indicates, with time accuracy of 45 KHz, where the start point of the SubPlayItem identified by SubPlayItem_In_time is located on the playback time axis of Play Item identified by sync_PlayItem_id. When a SubPlayItem defines a playback section on the secondary video stream, and when sync_start_PTS_of_PlayItem of the SubPlayItem identifies one point on the PlayItem time axis, the SubPlayItem realizes "synchronization picture-in-picture."

An indeterminate value (0xFFF) can be set for this Sync_Start_Pts_of_PlayItem. This indeterminate value indicates the point when a user performs a lock operation on the time axis of PlayItem identified by Sync_PlayItem_Id as a synchronization point of a PlayItem identified by Sync_PlayItem_Id. When sync_start_PTS_of_PlayItem is set to an indeterminate value, and when SubPlayItem is for playing back a secondary video stream, the SubPlayItem realizes "non-synchronization picture-in-picture."

The structure of the SubPlayItem information is closed up with the leader lines in FIG. 24.

The SubPlayItem defines a playback path of at least one elementary stream separated from the mainpath, and indicates a type according to how the subplpath is synchronized with the mainpath. If the subpaths used in the SubPlayItems are the subpaths of the Primary audio/PG/IG/Secondary audio/Secondary video, these SubPlayItems are synchronized with the mainpath using the PlayItem in the PlayList. The elementary streams used by the subpaths to play back this elementary streams are multiplexed on a clip, i.e. SubClip, separated from the MainClip used by a PlayItem of the MainPath.

Figure 25:
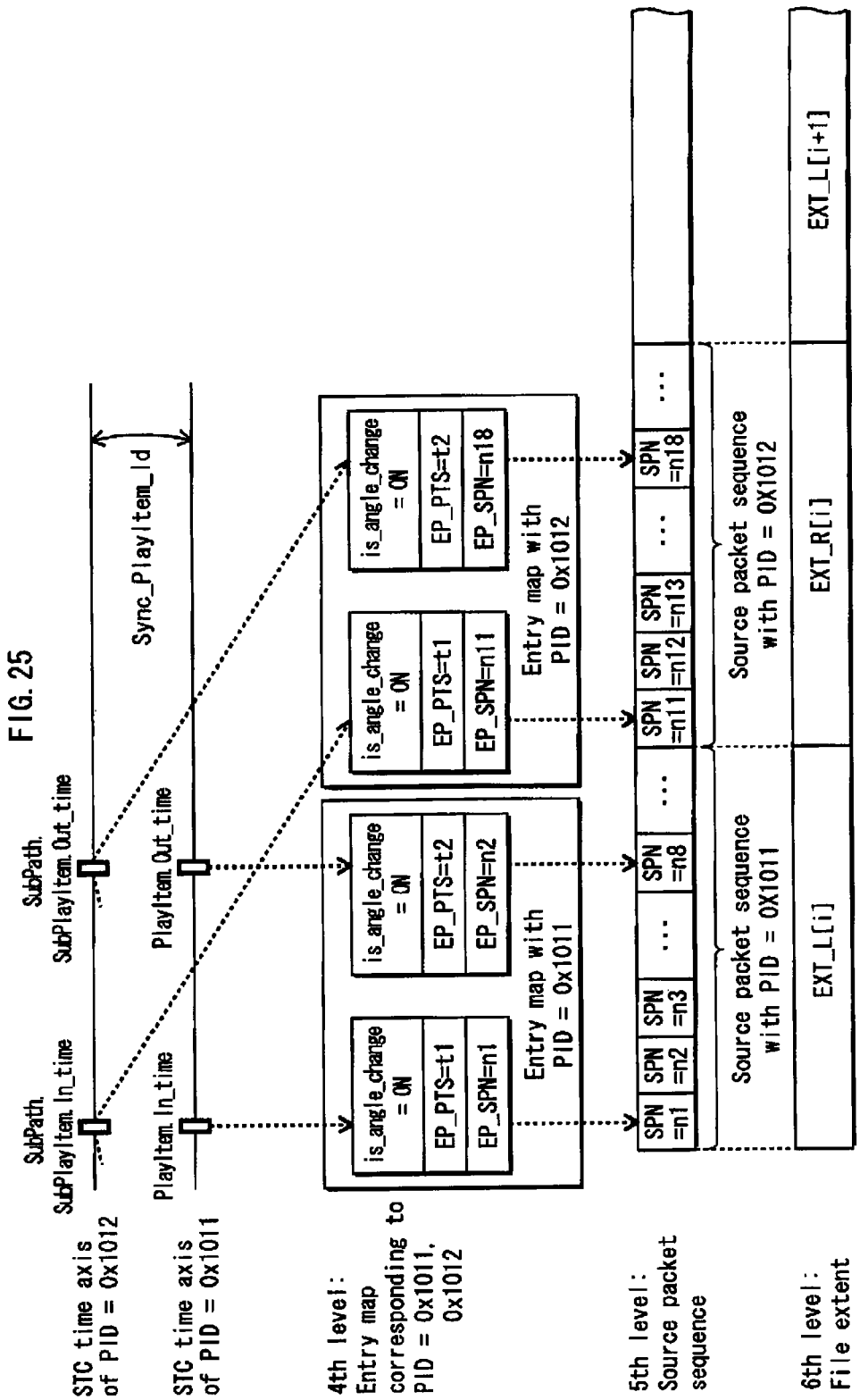
FIG. 25 shows what playback section is defined for the base view and the enhanced view.

FIG. 25 shows what playback sections are defined for the left view and the right view. FIG. 25 is based on FIG. 22. According to FIG. 22, In_Time and Out_Time of PlayItem are shown on the time axis in the first level and In_Time and Out_Time of SubPlayItem are shown on the time axis in the second level. The fourth level and the fifth level of FIG. 25 are identical to those of FIG. 22. An I picture of the left view is at the same point as that of the right view on the time axis.

The left view and the right view are associated with each other based on the PlayItem information and the SubPlayItem information.

Figure 26:
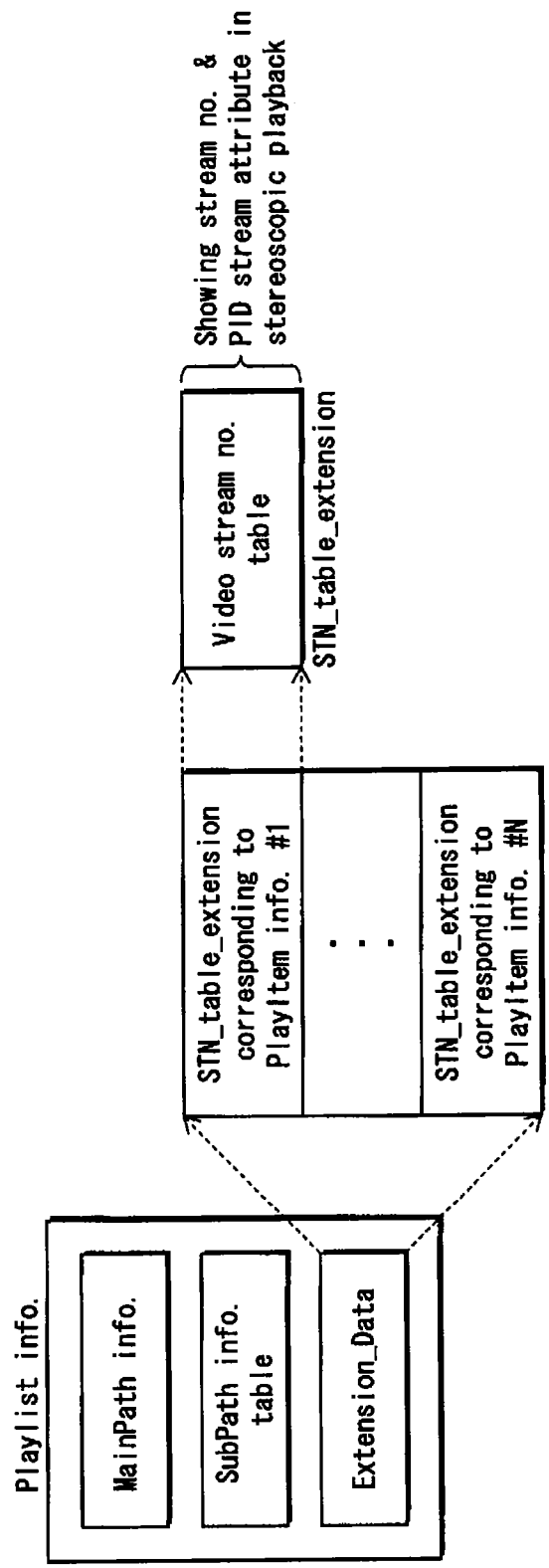
FIG. 26 shows the internal structure of extension data in playlist information.

A description is given of extension data. FIG. 26 shows the internal structure of the extension data in the playlist information. The internal structure of the extension data is closed up with the leader lines. As shown with the leader lines, the extension data is constituted from STN_table_extensions each associated with a different one of pieces of PlayItem information #1-#N.

The STN_table_extension is an STN table read out by a BD-ROM playback device capable of stereoscopic video playback. As closed up with the leader lines, the STN_table_extension includes a video stream no. table showing assignment of a stream number, PID, and a stream attribute during stereoscopic video playback.

Figure 27:
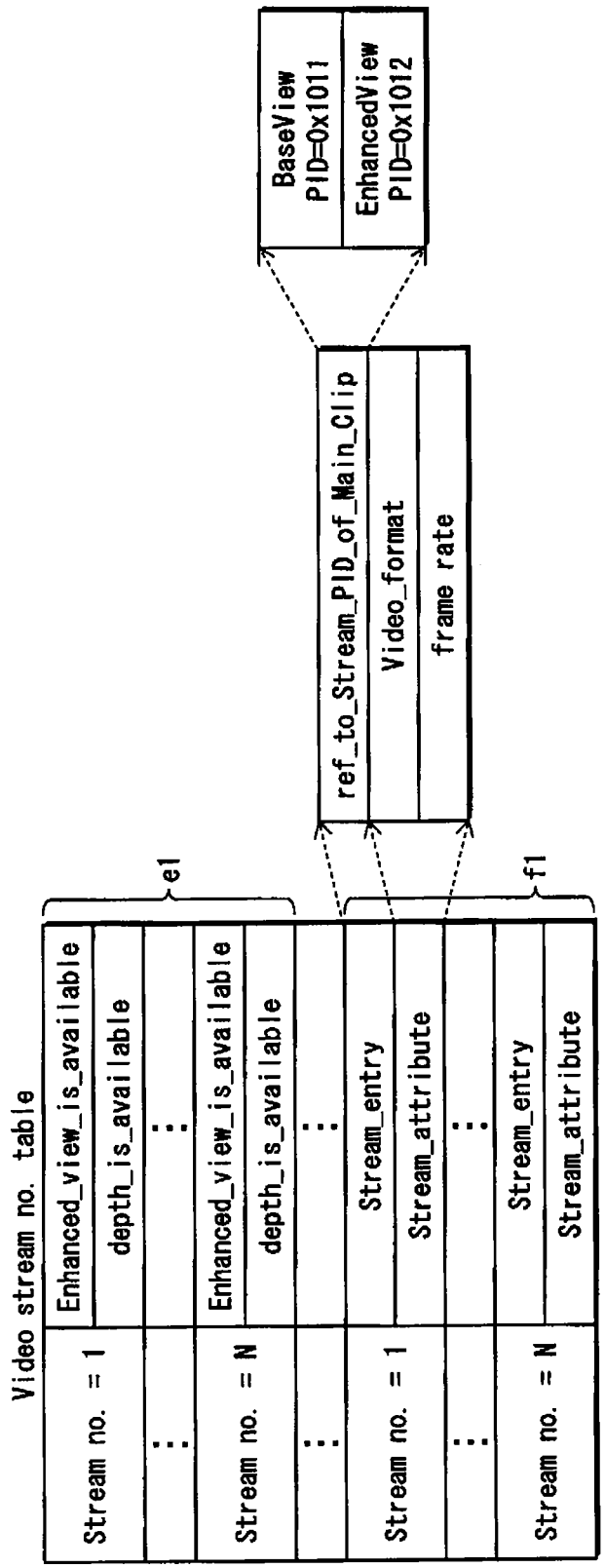
FIG. 27 shows the internal structure of a video stream no. table.

FIG. 27 shows the internal structure of the video stream no. table. The video stream no. table is constituted from N pairs e1 of enhanced_view_is_available flags and depth_is_available flags and N pairs f1 of stream_entry and stream_attribute. These pairs of flags are associated with stream numbers 1-N. A pair of the enhanced_view_is_available flag and the depth_is_available flag and a pair of the stream_entry and the stream_attribute can be uniquely identified by the stream numbers 1-N.

The Stream_entry includes "ref_to_stream_PID_of_main_Clip" that shows a reference value of a PID of a PES packet constituting a base view video stream and a reference value of a PID of a PES packet constituting an enhanced view video stream, "video_format" and "frame_rate".

The order of the stream_entry in these tables means a priority of a stream selected by a playback device. That is to say, a playback device preferentially selects a stream whose entry has higher priority in the stream_entry table.

When the enhanced_view_is_available flag is ON and when enhanced view is set, a packet ID 1101 and a packet ID 1012 are described in the ref_to_stream_of_MainCLip. When the depth_is_available flag is ON and when depth view is set, a packet ID 1101 and a packet ID 1013 are described in the ref_to_stream_of_MainCLip.

A packet ID 1011 is described in the stream number for identifying the base view video stream, and a packet ID 1012 is described in the stream number for identifying the enhanced view video stream. Accordingly, when the stream number corresponding to a BD-ROM playback device capable of stereoscopic video playback is stored in a stream number register, a TS packet with a packet ID 1011 and a TS packet with a packet ID 1012 are supplied to a decoder. Thus, the base view stream and the enhanced view stream can be separately decoded by a decoder.

As described above, a BD-ROM playback device incapable of stereoscopic video playback and a BD-ROM playback device capable of stereoscopic video playback each read a different STN_table. As a result, a PID is recognized as a stream number based on an STN_table that is different depending on a type of the playback device. Thus, "STN_table (2D)" in the MainPath information partially corresponds to the base location information included in the navigation information pertaining to the present invention, and "STN_table_extension" of extension data partially corresponds to the enhanced location information included in the navigation information pertaining to the present invention.

As above, the description is given of the BD-ROM 101 pertaining to the embodiment.

<Playback Device 102>

Subsequently, a description is given of a playback device 102 performing stereoscopic video playback using the BD-ROM 101 pertaining to the embodiment.

Figure 28:
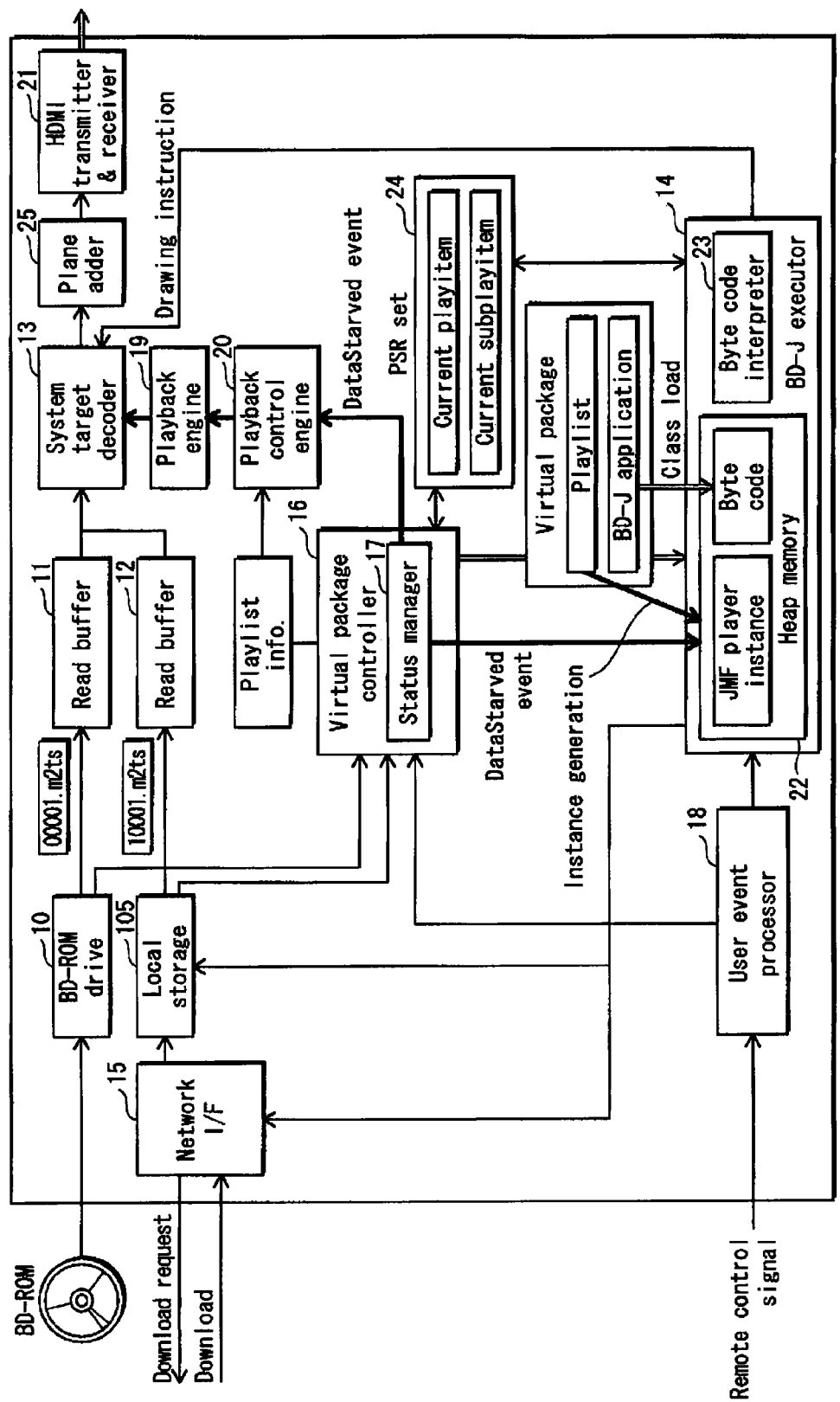
FIG. 28 shows an example of the structure of the playback device 102.

FIG. 28 shows an example of the structure of the playback device 102. The playback device 102 includes a BD-ROM drive 10, a read buffer 11, a read buffer 12, a system target decoder 13, a BD-J executor 14, a network interface 15, a virtual package controller 16, a status controller 17, a user event processor 18, a playback engine 19, a playback control engine 20, an HDMI transmitter & receiver 21, a heap memory 22, a byte coder interpreter 23, and a PSR set 24. A description is given of these constituents below.

<BD-ROM Drive 10>

The BD-ROM drive 10 reads out data from a BD-ROM disc and stores the data in the read buffer 11.

<Read Buffer 11>

The read buffer 11 is a buffer constituted from a memory, etc. for temporarily storing therein data read with the use of a BD-ROM drive.

<Read Buffer 12>

The read buffer 12 is a buffer constituted from a memory, etc. for temporarily storing therein data read from a local storage.

<System Target Decoder 13>

The system target decoder 13 demultiplexes source packets read out by the read buffer 11 and the read buffer 12 and decodes and plays back each stream. The system target decoder 13 also decodes and plays back graphics data such as JPEG and PNG to be displayed on a menu, etc. by the BD-J executor 14.

<BD-J Executor 14>

The BD-J executor 14 is a program processing engine that executes a BD-J application transferred from the virtual package controller 16. The BD-J executor 14 executes an operation based on a program of the BD-J application and the following control. The BD-J executor 14 (1) plays back a playlist for the virtual package controller 16, (2) downloads an update kit from a WWW server such as Internet and accumulates it in a local storage, (3) commands to structure a virtual package by combining a BD-ROM and an update kit, (4) set a value to a player variable, and (5) transfers PNG, JPEG used for graphics in a menu and a game to the system target decoder and displays it on the screen. This control can be performed without restriction based on the structure of a program, and the control way depends on a programming process of a BD-J application by the authoring process.

<Network Interface 15>

The network interface 15 realizes a communication function in the playback device. When URL is specified by a BD-J application, the network interface 15 establishes TCP connection, FTP connection, etc. with a website corresponding to the URL. This connection establishment causes a Java™ application to perform download from a website.

<Virtual Package Controller 16>

The virtual package controller 16 has a function of controlling the BD-ROM drive 10 and the local storage 105, structuring a virtual package, and controlling playback of the player. A virtual package is a virtual BD-ROM package on a memory obtained by combination of content recorded on a BD-ROM disc with differential data stored in the local storage 105 and merge management information stored in the local storage 105. A structured virtual package has the same format as the data structure of a BD-ROM. A virtual package is structured when a disc is placed, when the BD-J executor 14 executes a command to structure a virtual package, or the like. After the virtual package has been structured, the virtual package controller 16 controls playback processing of an AV clip via playlist information based on a playback instruction by the BD-J executor and a notification from the user event processor. Also, the virtual package controller 16 sets and refers to a player variable and performs a playback operation.

<Status Controller 17>

The status controller 17 manages in which one of Missing status, Enable status, Disable status each AV clip in a BD-ROM or a local storage is, and controls whether to stop playback of a playlist.

Missing status means a status where an AV clip referred to by the PlayItem information and the SubPlayItem information does not exist in the BD-ROM or the local storage.

Enable status means a status where playback is possible at the virtual package controller 16 and is controlled by an API of the BD-J application. When the API for setting Enable status is executed, the attribute of the AV clip becomes read-only and the AV clip can be played back by the virtual package controller 16.

Disable status means a status opposite to the Enable status. The virtual package controller 16 is incapable of playing back the AV clip in Disable status. When the BD-J application has never set the AV clip to Enable status, the AV clip is in Disable status. If the BD-J application is in Enable status, API is used to change from Enable status to Disable status in order to delete or overwrite the AV clip.

Out of these AV clips, an AV clip in Missing status and an AV clip in Disable status are collectively referred to as Unavailable clips.

The control with regard to whether playlist playback is stopped is as follows. When the current SubPlayItem information is changed, it is judged whether AV clips referred to by the current SubPlayItem information are Unavailable clips. When the judgment is positive, DataStarved event is notified to the JMF player instance and the playback control engine, and the status of each of the JMF player instance and the playback control engine is changed from being in the playback status to the stop status.

<User Event Processor 18>

In response to a user operation through a remote controller, the user event processor 18 requests the BD-J executor 14 and the virtual package controller 16 to execute processing. For example, when a button is pushed with the remote controller, the user event processor 18 requests the BD-J executor 14 to execute a command of the button. For example, when a forwarding/rewinding button is pushed with the remote controller, the user event processor 18 commands the virtual package controller 16 to execute forwarding/rewinding processing of an AV clip included in the playlist that is currently played back.

<Playback Engine 19>

The playback engine 19 executes AV playback functions. The AV playback functions of the playback device form a group of conventional functions executed by the DVD player and the CD player. The functions include playback start (Play), playback stop (Stop), pause (Pause On), release of pause (Pause Off), release of Still function (still off), forwarding at specified speed (Forward Play(speed)), rewinding at specified speed (BackwardPlay(speed)), audio change (Audio Change), Secondary video change (Subtitle Change), and angle change (Angle Change). To realize the AV playback functions, the playback engine 19 controls the system target decoder such that an AV clip corresponding to a desired time point is decoded.

<Playback Control Engine 20>

The playback control engine 20 executes a playback control function of a playlist. The playback control function of a playlist, which is one of AV playback functions executed by the playback engine 19, is a function for starting and ending the playback based on current playlist information and clip information.

Here, the playback device 102 is capable of stereoscopic video playback. The playback control engine 20 executes a playback control function of a playlist with use of not "STN_table(2D)" included in each PlayItem information but with use of "STN_table_extension" in extension data in the STN table included in the current playlist information.

<HDMI Transmitter & Receiver 21>

The HDMI transmitter & receiver 21 receives, from another device connected via HDMI (HDMI: High Definition Multimedia Interface), information on the device, and transmits digital non-compression video having decoded by the system target decoder, along with LPCM and compressed audio data, to the other device connected via the HDMI.

Information on the other device received at the HDMI transmitter & receiver 21 includes, for example, information received from the TV 103 connected to the playback device 102. This device information received from the TV 103 enables the playback device 102 to recognize whether the TV 103 is capable of 3D or 2D playback.

<Heap Memory 22>

The heap memory 22 is a stack memory secured for the BD-J executor 14. The heap memory 22 stores therein a JMF player instance generated by a BD-J application and byte codes generated with the use of classloader of a BD-J application. They are each in a shape of a thread, and executed by the byte coder interpreter 23 in the first-in first-out system.

<Byte Coder Interpreter 23>

The byte coder interpreter 23 changes byte codes stored in the heap memory 22 to native codes executable by the CPU and causes the CPU to execute the codes.

<PSR Set 24>

The PSR set 24 is a player setting register or a player status register that stores therein a player variable. The player variable includes a system parameter (SPRM) indicating a status of a player and a general parameter (GPRM) that can be used for general purpose.

FIG. 6 shows a list of system parameters (SPRM).

SPRM (0):Language code
SPRM (1):Primary audio stream number
SPRM (2):Subtitle stream number
SPRM (3):Angle number
SPRM (4):Title number
SPRM (5):Chapter number
SPRM (6):Program number
SPRM (7):Cell number
SPRM (8):Selected key information
SPRM (9):Navigation timer
SPRM (10):Payback time information
SPRM (11):Mixing mode for Karaoke
SPRM (12):Country information for parental management
SPRM (13):Parental level
SPRM (14):Player setting value (video)
SPRM (15):Player setting value (audio)
SPRM (16):Language code for audio stream
SPRM (17):Language code for audio stream (extension)
SPRM (18):Language code for subtitle stream
SPRM (19):Language code for subtitle stream (extension)
SPRM (20):Player region code
SPRM (21):Secondary video stream number
SPRM (22):Secondary audio stream number
SPRM (23):Playback status
SPRM (24):Reserved
SPRM (25):Reserved
SPRM (26):Reserved
SPRM (27):Reserved
SPRM (28):Reserved
SPRM (29):Reserved
SPRM (30):Reserved
SPRM (31):Reserved The SPRM (10) is updated every time each picture data belonging to an AV clip is displayed. That is to say, if the playback device displays new picture data, the SPRM (10) is updated to a value indicating the display time (PTS) of the new picture data. Accordingly, one can find the current playback time point with reference to the SPRM (10).

The language code for the audio stream of the SPRM (16) and the language code for the subtitle stream of the SPRM (18) are items that can be set with an OSD of a player or the like, and show default language codes of the player. For example, it is possible to include the following function into the BD program file. If the language code for audio stream of the SPRM (16) is English, when a PlayList is played back, the stream selection information having the same language code is searched for in the stream selection table of the PlayItem, and the corresponding audio stream is selected and played back. These SPRMs are each stored in a register having a 32 bit word length. A value specifying the SPRM in the parenthesis basically means a register number of a corresponding register (Note that SPRM (21) and SPRM (22) do not mean the register numbers of corresponding registers.).

As above, the description is given of the internal structure of the playback device 102.

Subsequently, a description is given of the details of playlist playback.

Figure 29:
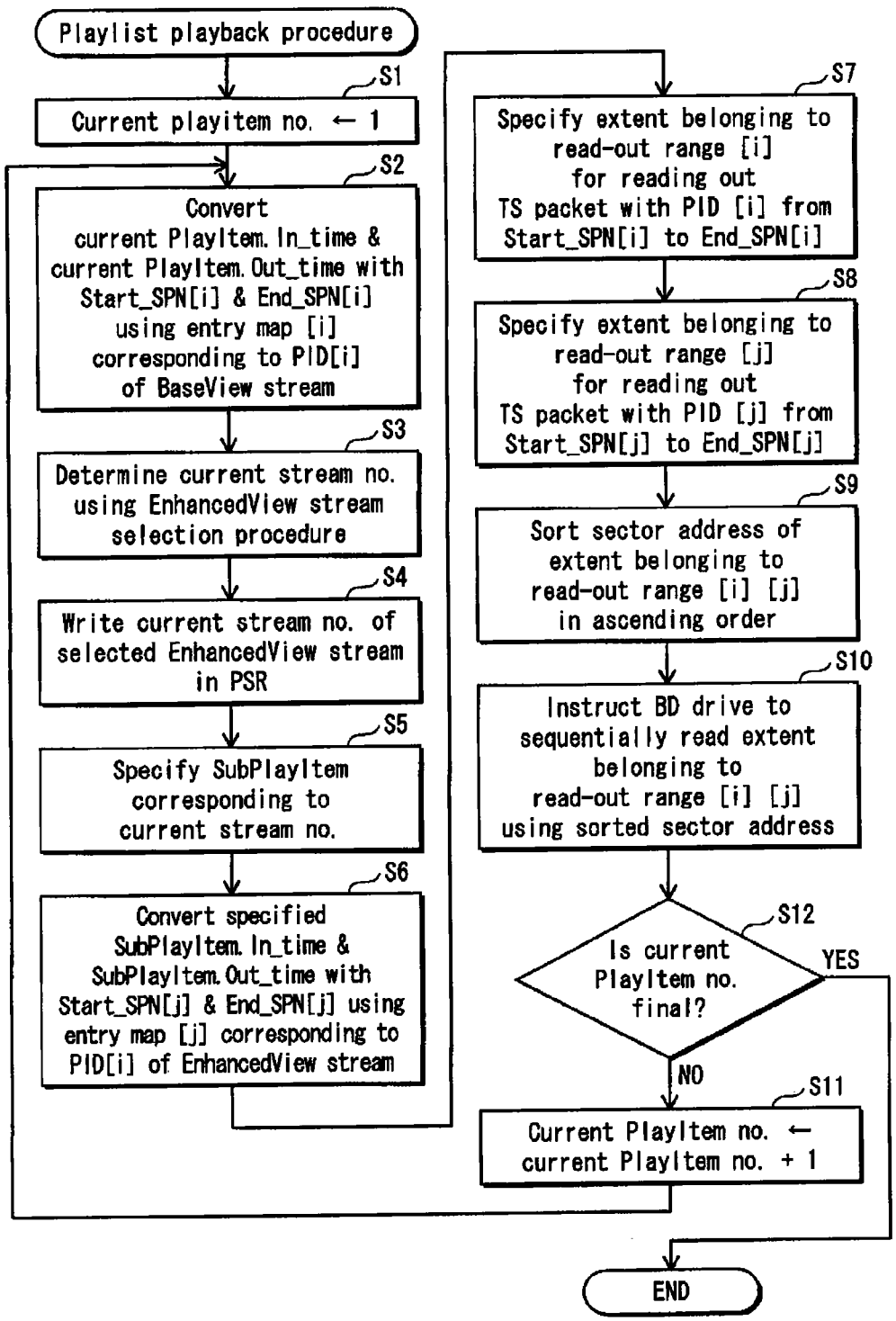
FIG. 29 is a flow chart showing the playback procedure of playlist information.

FIG. 29 is a flow chart showing the playback procedure of the playlist information.

In Step 1, current PlayItem number is initialized to "1", and the processing advances to the loop shown in Steps 2-12. This loop, where the processing in Steps 2-10 is executed on the current PlayItem to increment the current PlayItem (Step 11), is repeated till the last PlayIem becomes the current PlayItem (YES in Step 12). Steps 2-10 are as follows.

In Step 2, with the use of an entry map corresponding to a packet ID of a base view, the current PlayItem.In_Time and the current PlayItem.Out_Time are respectively changed to Start_SPN[i] and End_SPN[i].

A current stream number is determined by a stream selection procedure (Step 3). The selected stream number is written in PSR (Step 4). A SubPlayItem corresponding to the current stream number is specified (Step 5). SubPlayItem-In_Time and SubPlayItemOut_Time specified with the use of an entry map [j] corresponding to a packet ID [j] of the enhanced view are respectively changed to Start_SPN[j] and End_SPN[j] (Step 6).

Extents that belong to a read-out range[i] for reading out a TS packet[i] with a packet ID[i] from Start_SPN[i] to End_SPN[i] are specified (Step 7). Extents that belong to a read-out range for reading out a TS packet [j] of packet ID [j] from ST [j] to End_SPN[j] are specified (Step 8). In Step 9, the extents belonging to the read-out ranges [i] and [j] are sorted in the ascending order of the addresses. In Step 10, a drive is instructed to consecutively read the extents that belong to the read-out ranges [i] and [j] with the use of the sorted addresses.

Figure 30:
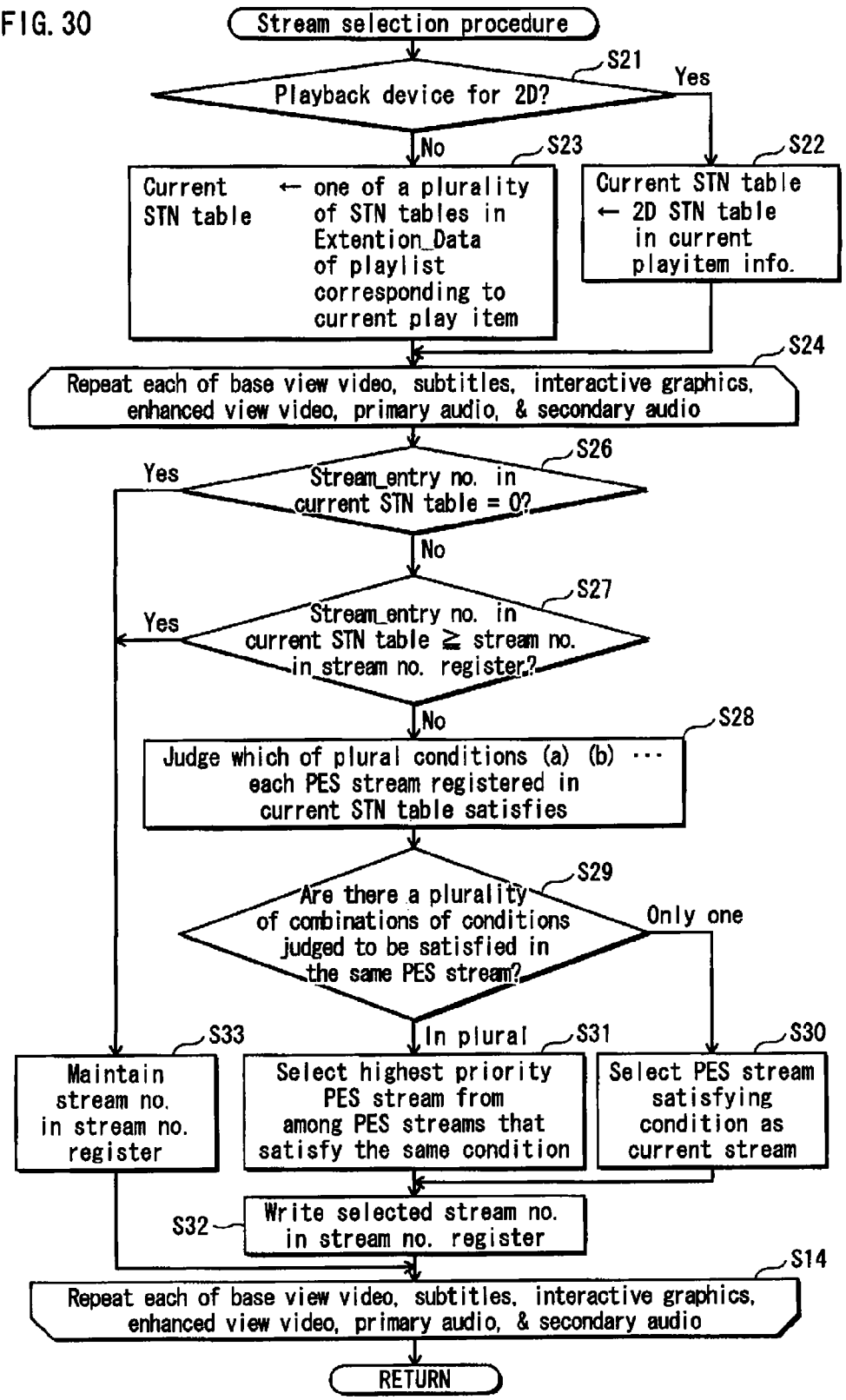
FIG. 30 is a flow chart showing the processing procedure of stream selection.

FIG. 30 is a flow chart showing the processing procedure of stream selection. Step 21 is a judgment step of judging whether the display system of the TV 103 is for 2D. If the judgment result is affirmative, 2D STN_table within the current PlayItem information is set as the current STN_table (Step 22). If the judgment result is negative, out of STN_tables in extension data in the playlist information, STN_table corresponding to the current PlayItem information is set as the current STN_table (Step 23). With this selection of the STN_table, the playback device 102 can output video data appropriate for the display system of the connected TV 103.

After setting of the current STN_table, the processing of Steps 24-34 is executed. From Step 24 to Step 34, the processing of Steps 26-33 is repeated on each of a base view video stream, an Interactive Graphics stream, an enhanced view video stream, a primary audio stream and a secondary audio stream. In Step 26, it is judged whether the STN_table entry number corresponding to a stream x in the current STN_table is 0. Step 27 is a judgment step of judging the stream entry number corresponding to the stream x in the current STN_table is equal to or larger than the stream number stored in the stream number register.

If the judgment result in either Step 26 or Step 27 is affirmative, the stream number stored in the stream number register is maintained (Step 33).

If the judgment results in both of Steps 26 and 27 are negative, it is judged which of a plurality of conditions are satisfied with one or more PES streams registered in the current STN_table (Step 28). It is judged whether there are a plurality of PES streams whose combinations of the satisfied conditions are the same (Step 29).

If there is only one PES stream that satisfies the conditions, the one PES stream is selected (Step 30).

If there are a plurality of PES streams satisfying the conditions, out of the PES streams that have been judged to satisfy the same conditions, a PES stream having the highest priority in the current STN_table is selected (Step 31).

Subsequently, the selected PES stream numbers are written in the stream number register.

As above, the description is given of the playback procedure of playlist information.

Note that the judgment in Step 21 in the above stream selection procedure may be modified to be based on user selection. According to this modification, selection of 2D or 3D video playback is inputted via the user event processor 18 in Step 21. When a user selects 2D playback, 2D STN_table in the current PlayItem information is set as the current STN_table (Step 22). When a user selects 3D playback, out of STN_tables in extension data in playlist information, a STN_table corresponding to the current PlayItem information is set as the current STN_table (Step 23). With this modification, video playback based on user preference is feasible.

Thus, according to the embodiment, a conventional playback device incapable of stereoscopic video playback is able to play back 2D video by reading out a base view stream from an optical disc. A playback device capable of both 2D and stereoscopic video playback is able to play back stereoscopic video images by reading out an enhanced view stream along with a base view stream from an optical disc. Since a conventional playback device incapable of stereoscopic video playback is backward compatible, the problems with regard to introduction of stereoscopic video display are alleviated.

(Other Modifications)

Note that although described based on the above embodiments, the present invention is never limited to them. The present invention also includes the following cases.

(1) The present invention may be directed to a recording method for recording data on an optical disc with the data structure described in each embodiment and a playback method for playing back the optical disc. Also, the present invention may be directed to a computer program including program codes for causing a computer to be operated by the recording method, and a digital signal constituted from the computer program.

Also, the present invention may be directed to the computer program or the digital signal recorded on a computer readable recording medium, such as a flexible disc, a hard disc, a CD-ROM, an MO, a DVD, a DVD-ROM, a DVD-RAM, a BD (Blu-ray Disc), and a semiconductor memory.

The present invention may be directed to the computer program or the digital signal transmitted via an electric communication line, wireless or wired communication line, or network such as the Internet.

Also, another independent computer system may implement the computer program or the digital signal carried by the recording medium or transferred via the network, etc.

(2) Out of the constituents shown in FIG. 28, the constituents except for the BD-ROM drive can be implemented as an LSI for controlling the playback device 102 by being integrated. Each of these constituents may be one chip, or part or all of the constituents may form one chip.

Here, LSI is employed. However, according to integration degree, the LCI may be referred to as an IC, a system LSI, a super LSI, or an ultra LSI.

In addition, the integrated circuit of the present invention is not limited to an LSI. The present invention may be realized in a dedicated circuit, or a general-purpose processor. The present invention may be realized in an FPGA (Field Programmable Gate Array) programmable after manufacturing LSI, or a reconfigurable processor whose connection and setting of circuit cells inside LSI are reconfigurable.

Furthermore, if a new technique of an integrated circuit that replaces LSI is created, as a semiconductor technique or another technique derived therefrom progresses, needless to say, the function blocks may be integrated with the use of the new technique. Application of a bio technique or the like is a potential application.

(3) In Embodiment 2, the description is given of only the portions in the BD-ROM standard related to the present invention are extracted, and using typical directories and files. However, needless to say, according to the present invention, other files defined in the BD-ROM standard are recordable on a BD-ROM.

(4) In the above embodiments, a BD-ROM complied with the BD-ROM standard is used as an example. However, the features of the present invention do not depend on the physical characteristics of a BD-ROM. The present invention is also applicable to another recording medium.

(5) The above embodiments and the modifications may be combined.

Industrial Applicability

According to the optical disc pertaining to the present invention, a playback device incapable of stereoscopic video playback can play back 2D video, and a playback device capable of stereoscopic video playback can play back 3D video. Thus, the optical disc pertaining to the present invention is highly applicable in the movie industry and the consumer appliance industry.

REFERENCE SIGNS LIST

10 drive
11 read buffer
12 read buffer
13 system target decoder
14 executor 15 network interface
16 virtual package controller
17 status controller
18 user event processor
19 playback engine
20 playback control engine
21 transmitter & receiver
22 heap memory
23 byte code interpreter
101 BD-ROM
102 playback device
103 TV
104 alternate-sequencing type stereo goggles
105 local storage

The invention claimed is:

1. A playback device, for playing back stereoscopic video, that plays back a video stream recorded on an optical disc and outputs played back video to a display device, the playback device comprising:
   a judgment unit operable to judge whether the display device is capable of stereoscopic display;
   a read unit operable to read out a video stream from the optical disc;
   a playback unit operable to play back the video stream; and
   a control unit, wherein
   the optical disc including an AV data recording area and a navigation information area,
   the AV data recording area has, recorded thereon, a transport stream where a plurality of first data blocks constituting a primary stream and a plurality of second data blocks constituting a secondary stream are arranged in an interleaved manner,
   each of the first data blocks is a source packet sequence including source packets generated by dividing and packetizing the primary stream,
   each of the second data blocks is a source packet sequence including source packets generated by dividing and packetizing the secondary stream,
   the primary stream is a video stream representing monoscopic video,
   the secondary stream is a video stream representing parallax video corresponding to the monoscopic video,
   the navigation information area has, recorded thereon, navigation information and playlist information, the navigation information including base location information and enhanced location information that is used only for stereoscopic video playback,
   the base location information indicates, by using source packet numbers assigned to source packets of the first data blocks, locations of areas where the first data blocks constituting the primary stream are recorded,
   the enhanced location information indicates, by using source packet numbers assigned to source packets of the second data blocks, locations of areas where second data blocks constituting the secondary stream are recorded,
   a data size of the first data blocks and a data size of the second data blocks are defined by:
   a first predetermined condition that allows a device, which reads out the transport stream from the optical disc with reference to the base location information, to decode and continually play back the primary stream while reading out the primary stream, and
   a second predetermined condition that allows a device, which reads out the transport stream from the optical disc with reference to both the base location information and the enhanced location information, to decode and continually play back both the primary stream and the secondary stream while reading out the primary stream and the secondary stream,
   the playlist information includes:
      a plurality of playback section information pieces each including a base stream selection table that includes entries of elementary streams in association with stream numbers, each of the entries including a packet identifier specifying, among source packets of a corresponding elementary stream, a source packet that is to be supplied to a decoder of playback unit when the display device is incapable of stereoscopic display; and
      a plurality of extension data pieces each including an, extension stream selection table that includes entries of elementary streams in association with stream numbers, each of the entries indicating a packet identifier specifying, among source packets of a corresponding elementary stream, a source packet that is to be additionally supplied to the decoder of the playback unit when the display device is capable of stereoscopic display,
   the control unit causes the read unit to read out:
      both the primary stream and the secondary stream with reference to the base location information and the enhanced location information when the display device is capable of stereoscopic display; and
      only the primary stream with reference to the base location information when the display device is incapable of stereoscopic display, and
   the control unit, when one playback section information piece among the plurality of the playback section information pieces included in the playlist information becomes a current playback section,
      selects one stream number from among the stream numbers included in the base stream selection table included in the one playback section information piece, and
      determines a source packet to be supplied to the decoder according to a packet identifier included in an entry that corresponds to the one stream number in either (i) the base stream selection table included in the one playback section information piece or (ii) an extension stream selection table corresponding to the one playback section information piece.

2. The playback device of claim 1, wherein
   the information included in the base location information, which indicates the location of the areas where the first data blocks are recorded by using the source packet numbers assigned to the source packets of the first data blocks, is an entry map of the primary stream, and
   the information included in the enhanced location information, which indicates the locations of the areas where the second data blocks are recorded by using the source packet numbers assigned to the source packets of the second data blocks, is an entry map of the secondary stream.

3. An optical disc including an AV data recording area and a navigation information area, wherein
   the AV data recording area has, recorded thereon, a transport stream where a plurality of first data blocks constituting a primary stream and a plurality of second data blocks constituting a secondary stream that are arranged in an interleaved manner,
   each of the first data blocks is a source packet sequence including source packets generated by dividing and packetizing the primary stream.

each of the second data blocks is a source packet sequence including source packets generated by dividing and packetizing the secondary stream, the primary stream is a video stream representing monoscopic video, the secondary stream is a video stream representing parallax video corresponding to the monoscopic video and played back with the primary stream by a playback device for playing back stereoscopic video, the navigation information area has, recorded thereon, navigation information and playlist information, the navigation information including base location information and enhanced location information that is used only for stereoscopic video playback, the base location information indicates, by using source packet numbers assigned to source packets of the first data blocks, locations of areas where the first data blocks constituting the primary stream recorded, the enhanced location information indicates, by using source packet numbers assigned to source packets of the second data blocks, locations of areas where second data blocks constituting the secondary stream are recorded, a data size of the first data blocks and a data size of the second data blocks are defined by:
  a first predetermined condition that allows a device, which reads out the transport stream from the optical disc with reference to the base location information, to decode and continually play back the primary stream while reading out the primary stream, and
  a second predetermined condition that allows a device, which reads out the transport stream from the optical disc with reference to both the base location information and the enhanced location information, to decode and continually play back both the primary stream acid the secondary stream while reading out the primary stream and the secondary stream, and the playlist information includes:
  a plurality of playback section information pieces each including a base stream selection table that includes entries of elementary streams in association with stream numbers, each of the, entries including a packet identifier specifying among source packets of a corresponding elementary stream, a source packet that is to be supplied to a decoder of the playback unit when the display device is incapable of stereoscopic display; and
  a plurality of extension data pieces each in including an extension stream selection table that includes entries of elementary streams in association with stream numbers, each of the entries indicating a packet identifier specifying, among source packets of a corresponding elementary stream, a source packet that is to be additionally supplied to the decoder of the playback unit when the display device is capable of stereoscopic display.

4. An integrated circuit controlling a playback device, for playing back stereoscopic video, that plays back a video stream recorded on an optical disc and outputs played back video to a display device, the integrated circuit comprising:
  a judgment unit operable to judge whether the display device is capable of stereoscopic display;
  a read control unit operable to cause a read unit of the playback device to read out a video stream from the optical disc;
  a playback unit operable to play back the video stream, and
  a control unit, wherein the optical disc includes an AV data recording area and a navigation information area, the AV data recording area has, recorded thereon, a transport stream where a plurality of first data blocks constituting a primary stream and a plurality of second data blocks constituting a secondary stream are arranged in an interleaved manner, each of the first data blocks is a source packet sequence including source packets generated by dividing and packetizing the primary stream, each of the second data blocks is a source packet sequence including source packets generated by dividing and packetizing the secondary stream, the primary stream is a video stream representing monoscopic video, the secondary stream is a video stream representing parallax video corresponding to the monoscopic video, the navigation information area has, recorded thereon, navigation information and playlist information, the navigation information including base location information and enhanced location information that is used only for stereoscopic video playback, the base location information indicates, by using source packet numbers assigned to source packets of the first data blocks locations of areas where the first data blocks constituting the primary stream are recorded, the enhanced location information indicates, by using source packet numbers assigned to source packets of the second data blocks, locations of areas where second data blocks constituting the secondary stream e recorded, a data size of the first data blocks and a data size of the second data blocks are defined by:
  a first predetermined condition that allows a device, which reads out the transport stream from the optical disc with reference to the base location information, to decode and continually play back the primary stream while reading out the primary stream, and
  a second predetermined condition that allows a device, which reads out the transport stream from the optical disc with reference to both the base location information and the enhanced location information, to decode and continually play back both the primary stream and the secondary stream while reading out the primary stream and the secondary stream, the playlist information includes:
  a plurality of playback section information pieces each including a base stream selection table that includes entries of elementary stream in association with stream numbers each of the entries including a packet identifier specifying among source packets of a corresponding elementary stream, a source packet that is to be supplied to a decoder of the playback unit when the display device is incapable of stereoscopic display; and
  a plurality of extension data pieces each including an extension stream selection table that includes entries of elementary stream in association with stream numbers, each of entries indicating a packet identifier specifying among source packets of a corresponding elementary stream, a source packet that is to be additionally supplied to the decoder of the playback unit when the display device is capable of stereoscopic display, the read control unit causes the read unit of the playback device to read out:
both the primary stream and the secondary stream with reference to the base location information and the enhanced location information when the display device is capable of stereoscopic display; and
only the primary stream with reference to the base location information when the display device is incapable of stereoscopic display, and
the control nit, when one playback section information piece among the plurality of the playback section information pieces included in the playlist information becomes a current playback section,
selects one stream number from among the stream numbers included in the base stream selection table included in the one playback section information piece, and
determines a source packet to be supplied to the decoder according to a packet identifier included in an entry that corresponds to the one stream number in either (i) the base stream selection table included in the one playback section information piece or (ii) an extension stream selection table corresponding to the one playback section information piece.

5. A non-transitory computer-readable recording medium having recorded thereon a program that causes a computer for playing back stereoscopic video to play back a video stream recorded on an optical disc and to output played back video to a display device, the program comprising the steps of:
judging whether the display device is capable of stereoscopic display;
reading out a video stream from the optical disc;
playing back the video stream; and
controlling, wherein
the optical disc includes an AV data recording area and a navigation information area,
the AV data recording area has, recorded thereon, a transport stream where a plurality of first data blocks constituting a primary stream and a plurality of second data blocks constituting a secondary stream are arranged in an interleaved manner,
each of the first data blocks is a source packet sequence including source packets generated by dividing and packetizing the primary stream,
each of the second data blocks is a source packet sequence including source packets generated by dividing and packetizing the secondary stream,
the primary stream is a video stream representing monoscopic video,
the secondary stream is a video stream representing parallax video corresponding to the monoscopic video,
the navigation information area has, recorded thereon, navigation information and playlist information, the navigation information including base location information and enhanced location information that is used only for stereoscopic video playback,
the base location information indicates, by using source packet numbers assigned to source packets of the first data blocks, locations of areas where the first data blocks constituting the primary stream are recorded,
the enhanced location information indicates, by using source packet numbers assigned to source packets of the second data blocks, locations of areas where second data blocks constituting the secondary stream are recorded, a data size of the first data blocks and a data size of the second data blocks are defined by:
a first predetermined condition that allows a device, which reads out the transport stream from the optical disc with reference to the base location information, to decode and continually play back the primary stream while reading out the primary stream, and
a second predetermined condition that allows a device, which reads out the transport stream from the optical disc with reference to both the base location information and the enhanced location information, to decode and continually play back both the primary stream and the secondary stream while reading out the primary stream and the secondary stream,
the playlist information includes:
a plurality of playback section information pieces each including a base stream selection table that includes entries of elementary streams in association with stream numbers, each of the entries including a packet identifier specifying, among source packets of a corresponding elementary stream a source packet that is to be supplied to a decoder of the playback unit when the display device is incapable of stereoscopic display; and
a plurality of extension data pieces each including an extension stream selection table that includes entries of elementary streams in association with stream numbers, each of the entries indicating a packet identifier specifying, among source packets of a corresponding elementary stream, a source packet that is to be additionally supplied to the decoder of the playback unit when the display device is capable of stereoscopic display,
in the reading step,
both the primary stream and the secondary stream are read out with reference to the base location information and the enhanced location information when the display device is capable of stereoscopic display; and
only the primary stream is read out with reference to the base location information when the display device is incapable of stereoscopic display, and
the controlling step, when one playback section information piece among the plurality of the playback section information pieces included in the playlist information becomes a current playback section,
selects one stream number from among the stream numbers included in the base stream selection table included in the one playback section information piece, and
determines a source packet to be supplied to the decoder according to a packet identifier included in an entry that corresponds to the one stream number in either (i) the base stream selection table included including in the one playback section information piece or (ii) an extension stream selection table corresponding to the one playback section information piece.

6. A playback method used by a playback device, for playing back stereoscopic video, that plays back a video stream recorded on an optical disc and outputs played back video to a display device, the method comprising the steps of:
judging whether the display device is capable of stereoscopic display;
reading out a video stream from the optical disc;
playing back the video stream; and
controlling, wherein
the optical disc includes an AV data recording area and a navigation information area, the AV data recording area has, recorded thereon, a transport stream where a plurality of first data blocks constituting a primary stream and a plurality of second data blocks constituting a secondary stream are arranged in an interleaved manner, each of the first data blocks is a source packet sequence including source packets generated by dividing and packetizing the primary stream, each of the second data blocks is a source packet sequence including source packets generated by dividing and packetizing the secondary stream, the primary stream is a video stream representing monoscopic video, the secondary stream is a video stream representing parallax video corresponding to the monoscopic video, the navigation information area has, recorded thereon, navigation information and playlist information, the navigation information including base location information and enhanced location information that is used only for stereoscopic video playback, the base location information indicates, by using source packet numbers assigned to source packets of the first data blocks, locations of areas where the first data blocks constituting the primary stream are recorded, the enhanced location information indicates, by using source packet numbers assigned to source packets of the second data blocks, locations of areas where second data blocks constituting the secondary stream are recorded, a data size of the first data blocks and a data size of the second data blocks are defined by:
  a first predetermined condition that allows a device, which reads out the transport stream from the optical disc with reference to the base location information, to decode and continually play back the primary stream while reading out the primary stream, and
  a second predetermined condition that allows a device, which reads out the transport stream from the optical disc with reference to both the base location information and the enhanced location information, to decode and continually play back both the primary stream and the secondary stream while reading out the primary stream and the secondary stream, the playlist information includes:
  a plurality of playback section information pieces each including a base stream selection table that includes entries of elementary streams in association with stream numbers each of the entries including a packet identifier specifying among source packets of a corresponding elementary stream, a source packet that is to be supplied to a decoder of the playback unit when the display device is incapable of stereoscopic display; and
  a plurality of extension data pieces each including an extension stream section table that includes entries of elementary streams in association with stream numbers, each of the entries indicating a packet identifier specifying, among source packets of a corresponding elementary stream, a source packet that is to, be additionally supplied to the decoder of the playback unit when the display device is capable of stereoscopic display, in the reading step,
  both the primary stream and the secondary stream are read out with reference to the base location information and the enhanced location information when the display device is capable of stereoscopic display; and
  only the primary stream is read out with reference to the base location information when the display device is incapable of stereoscopic display, and the controlling step, when one playback section information piece among the plurality of the playback section information pieces including in the playlist information becomes a current playback section,
  selects one stream number from among the stream numbers included in the base stream selection table including in the one playback section information piece, and
  determines source packet to be supplied to the decoder according to a packet identifier including in an entry that corresponds to the one stream number in either (i)the base stream selection table included in the one playback section information piece or (ii) an extension stream selection table corresponding to the one playback section information piece.

7. The playback device of claim 1, wherein
the first data blocks constituting the primary stream include encoded frames of the monoscopic video that are decodable without reference to the secondary stream,
the second data blocks constituting the secondary stream include encoded frames of the parallax video that are decodable with reference to the primary stream, and
the playback unit decodes the encoded frames of the monoscopic video before the encoded frames of the parallax video that are to he decoded with reference to the encoded frames of the monoscopic video.

8. The optical disc of claim 3, wherein
the information included in the base location information is an entry map of the primary stream, and
the information included in the enhanced location information is an entry map of the secondary stream.

9. The optical disc of claim 3, wherein
the first data blocks constituting the primary stream include encoded frames of the monoscopic video that are decodable without reference to the secondary stream,
the second data blocks constituting the secondary stream include encoded frames of the parallax video that are decodable with reference to the primary stream, and
in a playback device for playing back stereoscopic video, the encoded frames of the monoscopic video are decoded before the encoded frames of the parallax video that are to be decoded with reference to the encoded frames of the monoscopic video.

* * * * *